United States Patent
Kono

(10) Patent No.: US 9,069,495 B2
(45) Date of Patent: Jun. 30, 2015

(54) IMAGE PROCESSING APPARATUS, IMAGE PROCESSING SYSTEM, AND NON-TRANSITORY COMPUTER READABLE MEDIUM

(75) Inventor: Daisuke Kono, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 219 days.

(21) Appl. No.: 13/614,660

(22) Filed: Sep. 13, 2012

(65) Prior Publication Data

US 2013/0250326 A1    Sep. 26, 2013

(30) Foreign Application Priority Data

Mar. 23, 2012  (JP) ................ 2012-068149

(51) Int. Cl.
*G06K 15/00* (2006.01)
*G06F 3/12* (2006.01)
*H04N 1/00* (2006.01)

(52) U.S. Cl.
CPC ............ *G06F 3/1204* (2013.01); *G06F 3/1229* (2013.01); *G06F 3/126* (2013.01); *G06F 3/1292* (2013.01); *H04N 1/00225* (2013.01); *H04N 1/00228* (2013.01); *H04N 1/0023* (2013.01); *H04N 1/00233* (2013.01); *H04N 2201/0094* (2013.01); *H04N 2201/0074* (2013.01); *H04N 1/00206* (2013.01)

(58) Field of Classification Search
None
See application file for complete search history.

(56) References Cited

U.S. PATENT DOCUMENTS

| | | | | |
|---|---|---|---|---|
| 5,943,503 | A * | 8/1999 | Kai ................................ | 708/833 |
| 5,950,148 | A * | 9/1999 | Nakagawa et al. ............ | 702/182 |
| 6,801,962 | B2 * | 10/2004 | Taniguchi et al. .............. | 710/33 |
| 7,136,196 | B2 * | 11/2006 | Ishikawa ....................... | 358/402 |
| 7,197,257 | B2 * | 3/2007 | Nishizawa et al. ............. | 399/80 |
| 7,730,191 | B2 * | 6/2010 | Otsuka et al. ................. | 709/227 |
| 8,064,081 | B2 * | 11/2011 | Sumita et al. ................ | 358/1.15 |
| 8,355,152 | B2 * | 1/2013 | Akiyama ..................... | 358/1.15 |
| 2013/0095890 | A1 * | 4/2013 | Kono ............................ | 455/557 |
| 2013/0250325 | A1 * | 9/2013 | Alimpich et al. ............ | 358/1.13 |
| 2013/0250347 | A1 * | 9/2013 | Kono ........................... | 358/1.15 |

FOREIGN PATENT DOCUMENTS

| | | | |
|---|---|---|---|
| JP | 2002-509631 | A | 3/2002 |
| JP | 2007-532056 | A | 11/2007 |
| JP | 2008-210383 | A | 9/2008 |
| JP | 2009-187176 | A | 8/2009 |

* cited by examiner

*Primary Examiner* — Ashish K Thomas
(74) *Attorney, Agent, or Firm* — Sughrue Mion, PLLC

(57) ABSTRACT

An image processing apparatus includes a receiving unit, a selection unit, and a transmitting unit. The receiving unit receives, from a terminal apparatus connected to the image processing apparatus, a request for specific information. The selection unit selects at least one piece of specific information in accordance with the request. The transmitting unit transmits the at least one piece of specific information selected by the selection unit to the terminal apparatus. After the transmitting unit transmits the at least one piece of specific information to the terminal apparatus, the receiving unit receives command data based on the specific information from the terminal apparatus. The command data includes input source or output destination information indicating an output destination or acquisition source of data to be subjected to the image processing. The output destination or acquisition source is determined in accordance with an operation state of the terminal apparatus.

23 Claims, 9 Drawing Sheets

FIG. 2

| LEVEL | DEFINITION OF OPERATION STATE | VALUE OF OPERATION STATE |
|---|---|---|
| A | WHAT IS CURRENTLY OPERATING APPLICATION? | · VIEWER<br>· DATA MANAGEMENT APPLICATION<br>· EMAIL SOFTWARE<br>· ADDRESS BOOK |
| B | WHAT OPERATION IS BEING PERFORMED WITH CURRENTLY OPERATING APPLICATION? | <MAP APPLICATION><br>A MAP OF THE XXX AREA IS BEING DISPLAYED.<br><AUTHORING APPLICATION><br>AN IMAGE IS BEING DISPLAYED. |

FIG. 3

| APPLICATION | OPERATION STATE |
|---|---|
| VIEWER | CURRENTLY DISPLAYING A FILE |
| DATA MANAGEMENT APPLICATION | CURRENTLY DISPLAYING A FOLDER |
| EMAIL SOFTWARE | CURRENTLY CREATING AN EMAIL |
| ADDRESS BOOK | CURRENTLY DISPLAYING A DESTINATION |
| WEB BROWSER | CURRENTLY DISPLAYING A WEB PAGE/ CURRENTLY DISPLAYING A FILE |

FIG. 6

| OPERATION STATE | PRIORITY, FUNCTION |
|---|---|
| CURRENTLY DISPLAYING A FILE | (1) FILE to PRINTING<br>(2) FILE to EMAIL<br>(3) FILE to FACSIMILE TRANSMISSION<br>(4) DISPLAY OF A LIST OF FUNCTIONS |
| CURRENTLY DISPLAYING A FOLDER | (1) SCANNING to FOLDER<br>(2) ACQUISITION OF BOX DOCUMENT to TERMINAL APPARATUS<br>(3) DISPLAY OF A LIST OF FUNCTIONS |
| CURRENTLY CREATING AN EMAIL | (1) FILE to EMAIL<br>(2) ACQUISITION OF BOX DOCUMENT to TERMINAL APPARATUS<br>(3) DISPLAY OF A LIST OF FUNCTIONS |
| CURRENTLY DISPLAYING A DESTINATION | (1) FILE to EMAIL<br>(2) FILE to FACSIMILE TRANSMISSION<br>(3) DISPLAY OF A LIST OF FUNCTIONS |
| CURRENTLY DISPLAYING A WEB PAGE | (1) FILE to PRINTING<br>(2) FILE to EMAIL<br>(3) FILE to FACSIMILE TRANSMISSION<br>(4) DISPLAY OF A LIST OF FUNCTIONS |

FIG. 7

| CONTENT OF PROCESSING | FUNCTION | REFLECTION LOCATION |
|---|---|---|
| FILE to PRINTING | ACQUIRE AND PRINT SPECIFIED INPUT OR OUTPUT DATA | ACQUISITION SOURCE |
| FILE to EMAIL | ACQUIRE AND TRANSMIT SPECIFIED INPUT OR OUTPUT DATA VIA EMAIL | ACQUISITION SOURCE |
| FILE to FACSIMILE TRANSMISSION | ACQUIRE AND TRANSMIT SPECIFIED INPUT OR OUTPUT DATA VIA FACSIMILE | ACQUISITION SOURCE |
| SCANNING to FOLDER | SCAN DOCUMENT, OUTPUT INPUT OR OUTPUT DATA TO SPECIFIED FOLDER, AND STORE INPUT OR OUTPUT DATA | OUTPUT DESTINATION (STORAGE LOCATION) |
| SCANNING to DMS | SCAN DOCUMENT, OUTPUT INPUT OR OUTPUT DATA TO SPECIFIED DMS, AND STORE INPUT OR OUTPUT DATA | OUTPUT DESTINATION (STORAGE LOCATION) |

FIG. 10

| OPERATION STATE | INPUT SOURCE OR OUTPUT DESTINATION INFORMATION | ACQUISITION METHOD |
|---|---|---|
| CURRENTLY DISPLAYING A FILE ON THE VIEWER | • LOCAL PATH OR EXTERNAL ADDRESS OF FILE BEING DISPLAYED ON VIEWER<br>• WHETHER VIEWER WINDOW IS ACTIVE OR NOT | ACQUIRE BY CHECKING PROCESS AND FILE HAND |
| CURRENTLY DISPLAYING A FOLDER ON THE VIEWER | • LOCAL PATH OR EXTERNAL ADDRESS OF FOLDER BEING DISPLAYED ON VIEWER<br>• WHETHER VIEWER WINDOW IS ACTIVE OR NOT | ACQUIRE BY CHECKING PROCESS AND FILE HAND |
| CURRENTLY DISPLAYING A FILE ON THE WEB BROWSER | • LOCAL PATH OR EXTERNAL ADDRESS OF FILE BEING DISPLAYED ON WEB BROWSER<br>• WHETHER BROWSER WINDOW IS ACTIVE OR NOT | ACQUIRE BY CHECKING PROCESS AND FILE HAND |
| CURRENTLY DISPLAYING A WEB PAGE ON THE WEB BROWSER | • EXTERNAL ADDRESS OF WEB PAGE BEING DISPLAYED ON WEB BROWSER<br>• WHETHER BROWSER WINDOW IS ACTIVE OR NOT | ACQUIRE FROM BROWSER BY CHECKING PROCESS |

FIG. 11

| OBJECT BEING OPERATED | REFLECTION LOCATION | REFLECTION METHOD |
|---|---|---|
| FILE BEING DISPLAYED ON THE VIEWER | ACQUISITION SOURCE OF INPUT OR OUTPUT DATA | (A) LOCAL PATH OR EXTERNAL ADDRESS OF ACTIVE FILE<br>(B) ALL LOCAL PATHS OR EXTERNAL ADDRESSES |
| FOLDER BEING DISPLAYED ON THE VIEWER | OUTPUT DESTINATION (STORAGE LOCATION) OF INPUT OR OUTPUT DATA | (A) LOCAL PATH OR EXTERNAL ADDRESS OF ACTIVE FOLDER<br>(B) ALL LOCAL PATHS OR EXTERNAL ADDRESSES |
| WEB PAGE BEING DISPLAYED ON THE WEB BROWSER | ACQUISITION SOURCE OF INPUT OR OUTPUT DATA | (A) EXTERNAL ADDRESS OF ACTIVE WEB PAGE<br>(B) ALL EXTERNAL ADDRESSES OF WEB PAGES |

(A) SPECIFIED VALUE OR HIGHEST PRIORITY OPTION VALUE
(B) OPTION VALUES

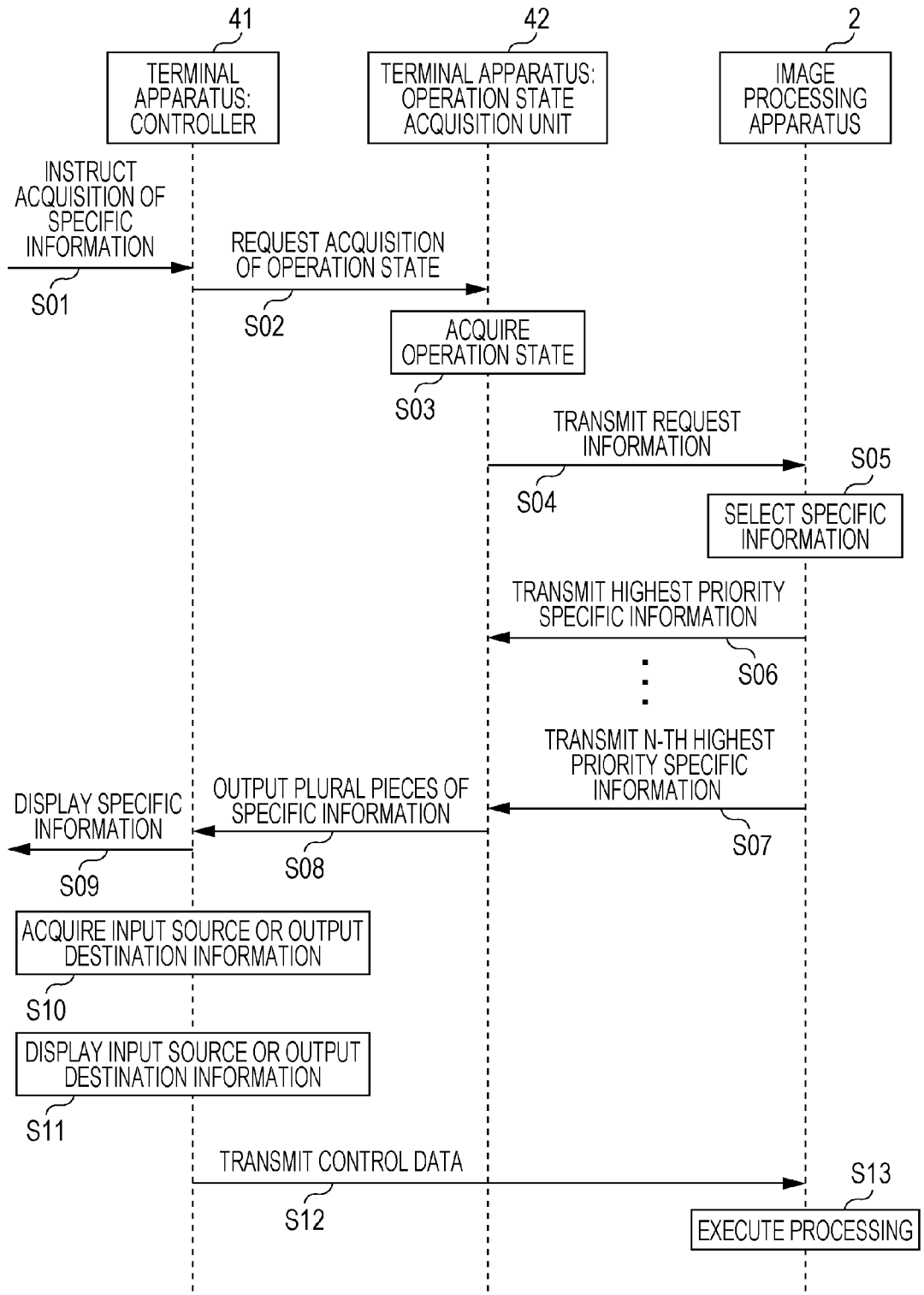

FIG. 13

|  | ACQUISITION SOURCE OR STORAGE LOCATION | PROCESSING METHOD | ASSOCIATED FUNCTION |
|---|---|---|---|
| ACQUISITION OF INPUT OR OUTPUT DATA | LOCAL PATH IN TERMINAL APPARATUS (FOLDER OR FILE) | UPLOAD INPUT OR OUTPUT DATA FROM TERMINAL APPARATUS TO IMAGE PROCESSING APPARATUS | FILE to PRINTING FILE to EMAIL FILE to FACSIMILE TRANSMISSION |
|  | EXTERNAL ADDRESS (FOLDER OR FILE) | DOWNLOAD INPUT OR OUTPUT DATA FROM CORRESPONDING ADDRESS USING IMAGE PROCESSING APPARATUS | FILE to PRINTING FILE to EMAIL FILE to FACSIMILE TRANSMISSION |
| OUTPUT (STORAGE) OF INPUT OR OUTPUT DATA | LOCAL PATH IN TERMINAL APPARATUS (FOLDER OR FILE) | TRANSMIT INPUT OR OUTPUT DATA AS RESPONSE FROM IMAGE PROCESSING APPARATUS TO TERMINAL APPARATUS | SCANNING to FOLDER SCANNING to DMS |
|  | EXTERNAL ADDRESS (FOLDER OR FILE) | UPLOAD INPUT OR OUTPUT DATA TO CORRESPONDING ADDRESS USING IMAGE PROCESSING APPARATUS | SCANNING to FOLDER SCANNING to DMS |

IMAGE PROCESSING APPARATUS, IMAGE PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-068149 filed Mar. 23, 2012.

BACKGROUND (i) Technical Field

The present invention relates to an image processing apparatus, an image processing system, and a non-transitory computer readable medium.

(ii) Related Art

In some cases, a user may wish to connect his/her terminal apparatus such as a mobile phone or a personal digital assistant (PDA) to an image processing apparatus that performs processing such as reading an image, printing an image, or transmitting image data via facsimile to transmit and receive data between the terminal apparatus and the image processing apparatus to cause the image processing apparatus to perform image processing.

SUMMARY

According to an aspect of the invention, there is provided an image processing apparatus including a receiving unit, a selection unit, and a transmitting unit. The receiving unit receives, from a terminal apparatus connected to the image processing apparatus via a communication path, a request for specific information for allowing the terminal apparatus to transmit command data relating to image processing. The selection unit selects at least one piece of specific information in accordance with the request. The transmitting unit transmits the at least one piece of specific information selected by the selection unit to the terminal apparatus. After the transmitting unit transmits the at least one piece of specific information to the terminal apparatus, the receiving unit receives from the terminal apparatus command data created by the terminal apparatus based on the specific information. The command data includes input source or output destination information indicating an output destination or acquisition source of data to be subjected to the image processing. The output destination or acquisition source is determined in accordance with an operation state of the terminal apparatus.

BRIEF DESCRIPTION OF THE DRAWINGS

An exemplary embodiment of the present invention will be described in detail based on the following figures, wherein:

FIG. 2 illustrates an example of definitions of operation states;

FIG. 3 illustrates an example of operation states;

FIG. 6 illustrates an example of functions corresponding to operation states;

FIG. 7 illustrates correspondence relationships between the content of image processing and output destination or acquisition sources of input or output data;

FIG. 10 illustrates correspondence relationships between operation states and input source or output destination information;

FIG. 11 illustrates locations where input or output data is reflected;

FIG. 12 is a sequence diagram illustrating an example of a processing procedure performed by the image processing system according to the exemplary embodiment of the present invention; and FIG. 13 illustrates methods for outputting or acquiring input or output data.

DETAILED DESCRIPTION

Figure 1:
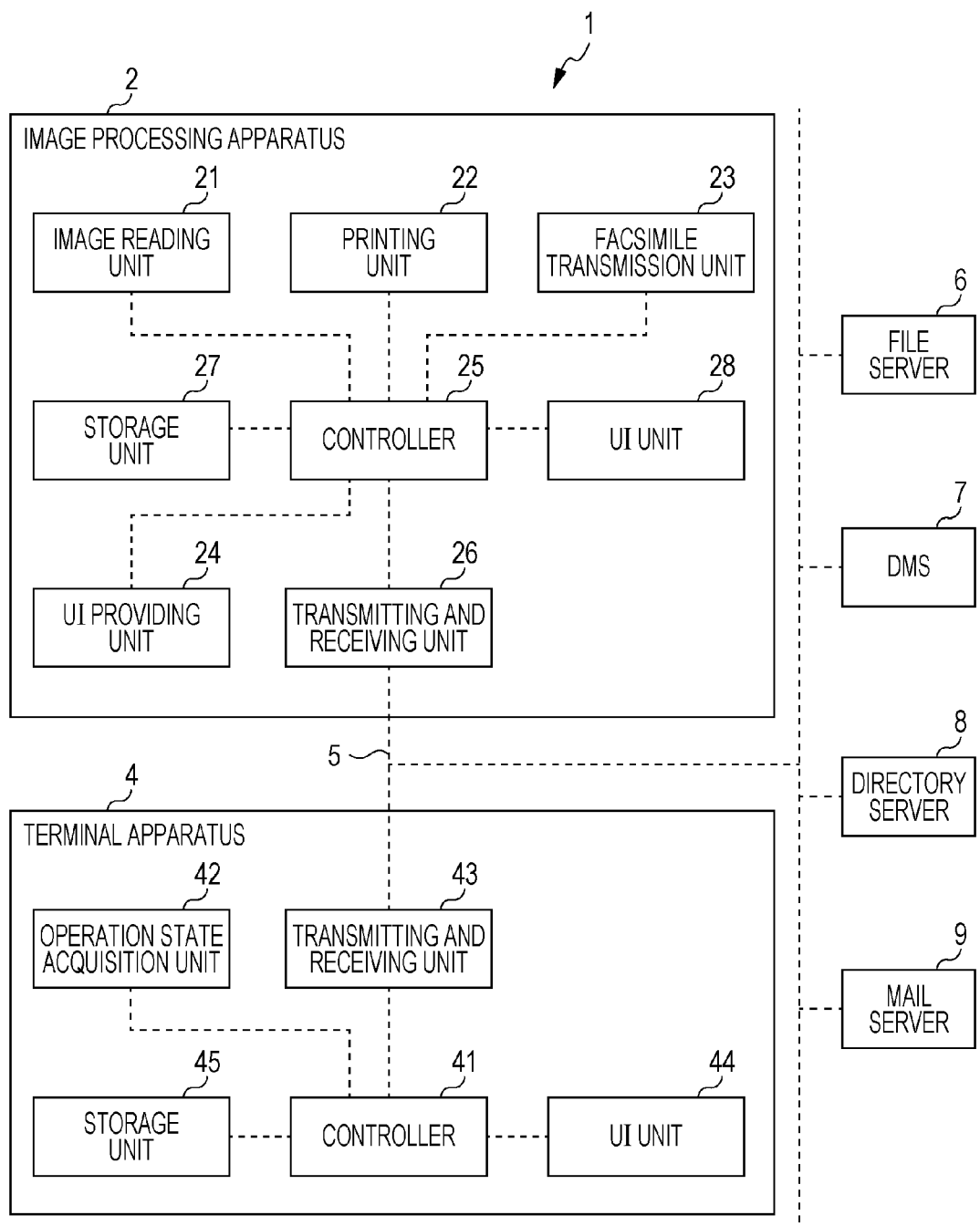
FIG. 1 is a block diagram illustrating an image processing system according to an exemplary embodiment of the present invention.

An image processing apparatus, an image processing system, and a program according to exemplary embodiments of the present invention will be described. FIG. 1 illustrates an example of an image processing system 1 according to an exemplary embodiment of the present invention. The image processing system 1 includes an image processing apparatus 2 and a terminal apparatus 4. The image processing apparatus 2 and the terminal apparatus 4 transmit and receive data via a communication path 5. For example, a file server 6, a document management system (DMS) 7, a directory server 8, and a mail server 9 are further connected to the communication path 5.

Image Processing Apparatus 2

The image processing apparatus 2 may be an apparatus having at least one of image processing functions including a function for printing received data and a function for reading an image on a document and converting the read image into electronic image data. The image processing apparatus 2 may be, for example, but not be limited to, an apparatus having functions of devices such as a copier, a printer, a scanner, and a facsimile machine. The image processing apparatus according to this exemplary embodiment may also be a printer having no scanning capabilities, a scanner having no printing capabilities, or the like. The image processing apparatus 2 may be installed in a place, for example, an office, a convenience store or drugstore, a library, a hotel, or an apartment.

Terminal Apparatus 4

The terminal apparatus 4 may be an apparatus that can be carried, such as a mobile phone or a PDA. The terminal apparatus 4 includes a storage unit 45 that stores input or output data such as document data and image data. The document data may be, for example, data created by the terminal apparatus 4 using document creation application software, or may be data created by another apparatus and transmitted to the terminal apparatus 4 via communication or the like. The image data may be, for example, data captured using a digital camera provided in the terminal apparatus 4, if any, or data captured using another camera and transmitted to the terminal apparatus 4 via communication or the like. The image data may also be data read by the image processing apparatus 2 or another image reading device and transmitted to the terminal apparatus 4 via communication or the like. In the following description, it is assumed that the input or output data includes document data, image data, a program, and any other control data.

Communication Path 5

The communication path 5 may be, for example, a network such as a local area network (LAN) or a wide area network (WAN). The image processing apparatus 2 and the terminal apparatus 4 may be connected to each other through the communication path 5 using a cable, via wireless data communication such as Wi-Fi (registered trademark), or in accordance with the G3 communication standard.

The image processing apparatus 2 and the terminal apparatus 4 may also be connected to each other via a communication path different from the communication path 5. The different communication path is a communication path different from a network such as a LAN or WAN, and may be a peer to peer (P2P) communication path for directly connecting the image processing apparatus 2 to the terminal apparatus 4, or an infrared or radio communication path. The different communication path may be implemented by wireless data communication or data communication based on IC cards, by way of example. Examples of the wireless data communication include infrared wireless data communication, known as Infrared Data Association (IrDA), and Bluetooth (registered trademark) data communication. Examples of the data communication based on IC cards include data communication using contactless IC card technologies such as Felica (registered trademark). When a communication path different from the communication path 5 is used, the image processing apparatus 2 and the terminal apparatus 4 may be connected to each other via two communication paths, that is, the communication path 5 and the different communication path.

Next, the image processing apparatus 2 will be described. As an example, the image processing apparatus 2 includes an image reading unit 21, a printing unit 22, a facsimile transmission unit 23, a user interface providing unit (or UI providing unit) 24, a controller 25, a transmitting and receiving unit 26, a storage unit 27, and a user interface unit (or UI unit) 28.
Image Reading Unit 21, Printing Unit 22, and Facsimile Transmission Unit 23

The image reading unit 21 reads an image on a document to generate input or output data representing the image, and stores the input or output data in the storage unit 27 in accordance with control of the controller 25. The printing unit 22 receives the input or output data stored in the storage unit 27, and prints the image based on the input or output data on a sheet in accordance with control of the controller 25. The facsimile transmission unit 23 receives the input or output data stored in the storage unit 27, and transmits the image based on the input or output data via facsimile in accordance with control of the controller 25. The image processing apparatus 2 may not necessarily include all the image reading unit 21, the printing unit 22, and the facsimile transmission unit 23, and may include at least one of the image reading unit 21, the printing unit 22, and the facsimile transmission unit 23. The image processing apparatus 2 may also have a copying function for reading an image on a document by using the image reading unit 21, and printing the read image on a sheet by using the printing unit 22 to copy the image on the document onto the sheet.
UI Providing Unit 24

The UI providing unit 24 creates data of a user interface (UI) for allowing a user to perform setting about the functions (image processing) of the image processing apparatus 2 using the terminal apparatus 4. For example, the UI providing unit 24 creates data of a user interface for allowing a user to set the operating conditions of the image reading unit 21, the printing unit 22, or the facsimile transmission unit 23 using the terminal apparatus 4. The UI providing unit 24 creates data of a user interface for a UI unit 44 of the terminal apparatus 4. A user interface for allowing a user to set the operating conditions for the functions of the image processing apparatus 2 may be hereinafter referred to as a "setting user interface" or a "setting UI". For example, the UI providing unit 24 creates hypertext markup language (HTML) data of the setting UI in order to display the setting UI on a web browser. The UI providing unit 24 may create HTML data of a setting UI using an object-oriented programming language such as JavaScript (registered trademark). The UI providing unit 24 may also create data of a setting UI including sound and moving images or animation by creating the data of the setting UI as a Flash (registered trademark) application. The UI providing unit 24 further creates connection information for allowing the terminal apparatus 4 to access data of a setting UI via the communication path 5. The connection information may be address data by which the terminal apparatus 4 accesses data of a setting UI. The address data may be, for example, Uniform Resource Locator (URL). When the terminal apparatus 4 is connected to the image processing apparatus 2 via the communication path 5, the UI providing unit 24 provides the terminal apparatus 4 with data of a setting UI via the communication path 5. The data of the setting UI and the related address data may be stored in the storage unit 27 in advance. For example, the UI providing unit 24 has a function of a web server, and data of a setting UI, which is generated in HTML form, is stored in the URL location provided by the web server. The terminal apparatus 4 accesses the URL specified by the address data, thereby displaying the setting UI on a web browser of the terminal apparatus 4 to allow the user to set operation conditions. The setting UI may not necessarily be a user interface to be displayed on a web browser but may be a user interface to be displayed on the terminal apparatus 4 in accordance with a specific computer program. Further, the UI providing unit 24 may create data of a user interface for allowing a user to set the operating conditions described above using the UI unit 28 of the image processing apparatus 2, and may provide the UI unit 28 with the created data of the user interface.
Controller 25

The controller 25 controls the operation of each individual unit of the image processing apparatus 2. For example, the controller 25 receives request information indicating a request for specific information and operation state information indicating the operation state of the terminal apparatus 4 from the terminal apparatus 4 via the transmitting and receiving unit 26. The controller 25 detects the operation state of the terminal apparatus 4 in accordance with the operation state information, selects one or more pieces of specific information relating to the operation state of the terminal apparatus 4, and controls the transmitting and receiving unit 26 to provide the selected piece or pieces of specific information to the terminal apparatus 4. For example, upon detecting, based on the operation state information, that the terminal apparatus 4 is in a specific operation state relating to image processing, the controller 25 selects specific information concerning one or more image processing operations expected to be executed by the image processing apparatus 2 after the specific operation state is completed. Plural pieces of specific information may be selected. In this case, the controller 25 selects plural pieces of specific information, which are assigned priorities in accordance with the operation state of the terminal apparatus 4, and controls the transmitting and receiving unit 26 to provide the terminal apparatus 4 with the plural pieces of specific information in accordance with the priorities. The controller 25 may be an example of a selection unit. The operation state of the terminal apparatus 4 and specific information will be described.

Operation State of Terminal Apparatus 4

Next, the operation state of the terminal apparatus 4 will be described. The operation state of the terminal apparatus 4 may be defined, as an example, as the type of application software operating on the terminal apparatus 4 or as an operation being performed using the application software operating on the terminal apparatus 4.

The operation state of the terminal apparatus 4 will be described with reference to FIG. 2. FIG. 2 illustrates an example of definitions of the operation state of the terminal apparatus 4. The operation state of the terminal apparatus 4 is assigned levels in accordance with accuracy. For example, in level A, the type of the application software operating on the terminal apparatus 4 corresponds to the operation state of the terminal apparatus 4. Examples of the value of the operation state may include "viewer", "data management application", "email software", and "address book". "Viewer" represents, for example, application software for allowing files of images and documents to be displayed on a display device. "Data management application" represents data management application software for managing files and folders. A file is a collection of pieces of data, and may also be referred to as a data set. A folder is a location to store files to be classified and managed in a storage device, and may also be referred to as a directory. "Email software" represents email application software for transmitting and receiving emails. "Address book" represents application software for managing emails addresses, telephone numbers, or numbers representing facsimile transmission destinations. For example, a map in which values of the operation state are associated with application software names is created in advance, and the value of the operation state representing the application software operating on the terminal apparatus 4 may be obtained on the basis of the name of the operating application software and the map.

Further, for example, in level B, the content of the operation being performed using the application software operating on the terminal apparatus 4 corresponds to the operation state of the terminal apparatus 4. For example, when map application software for displaying a map is operating on the terminal apparatus 4 and when a map of the area XXX is being displayed on the UI unit 44 of the terminal apparatus 4, the content that "a map of the area XXX is being displayed" corresponds to the value of an operation state. In addition, when authoring application software for editing data such as image and audio data is operating on the terminal apparatus 4 and when an image is being displayed on the UI unit 44 of the terminal apparatus 4, the content that "an image is being displayed" corresponds to the value of an operation state. An operation state acquisition unit 42 of the terminal apparatus 4, described below, detects the operation state of the terminal apparatus 4 in accordance with the standard of level A or the standard of level B.

FIG. 3 illustrates an example of operation states of the terminal apparatus 4. For example, when application software regarding a viewer is operating on the terminal apparatus 4 and when a file is being displayed on the UI unit 44 of the terminal apparatus 4, the content of "currently displaying a file" corresponds to the value of the operation state. In this case, operation state information indicating the content of "currently displaying a file" is transmitted from the terminal apparatus 4 to the image processing apparatus 2. In addition, when data management application software is operating on the terminal apparatus 4 and when a folder is being displayed on the UI unit 44 of the terminal apparatus 4, the content of "currently displaying a folder" corresponds to the value of the operation state. In this case, operation state information indicating the content of "currently displaying a folder" is transmitted from the terminal apparatus 4 to the image processing apparatus 2. In addition, when email application software is operating on the terminal apparatus 4 and when a user is creating an email, the content of "currently creating an email" corresponds to the value of the operation state. In this case, operation state information indicating the content of "currently creating an email" is transmitted from the terminal apparatus 4 to the image processing apparatus 2. In addition, when application software regarding an address book is operating on the terminal apparatus 4 and when an email address or a telephone number is being displayed on the UI unit 44 of the terminal apparatus 4, the content of "currently displaying a destination" corresponds to the value of the operation state. In this case, operation state information indicating the content of "currently displaying a destination" is transmitted from the terminal apparatus 4 to the image processing apparatus 2. In addition, when a web browser is operating on the terminal apparatus 4 and when a web page is being displayed on the UI unit 44 of the terminal apparatus 4, the content of "currently displaying a web page" corresponds to the value of the operation state. In this case, operation state information indicating the content of "currently displaying a web page" is transmitted from the terminal apparatus 4 to the image processing apparatus 2. In addition, when a web browser is operating on the terminal apparatus 4 and when a file is being displayed on the UI unit 44 of the terminal apparatus 4, the content of "currently displaying a file" corresponds to the value of the operation state. In this case, operation state information indicating the content of "currently displaying a file" is transmitted from the terminal apparatus 4 to the image processing apparatus 2.

Figure 4:
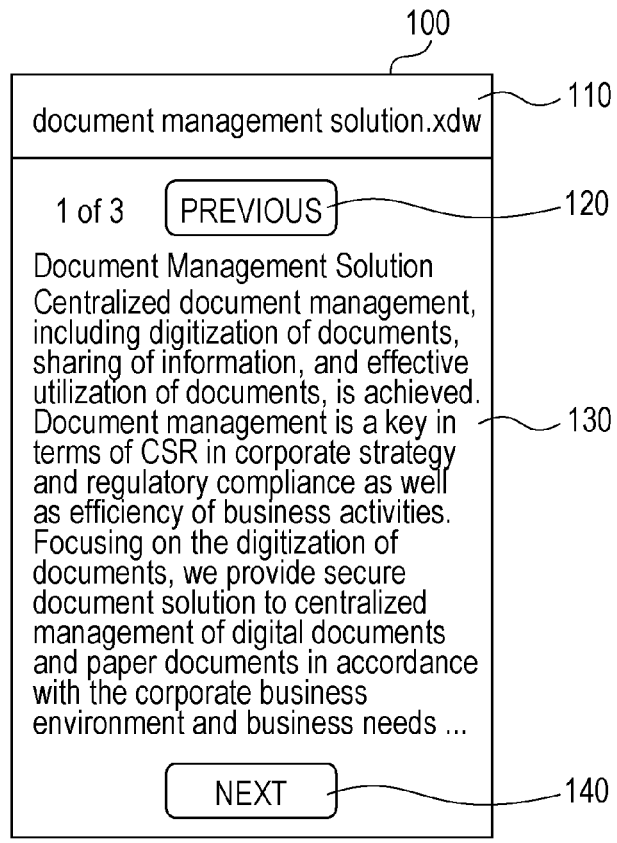
FIG. 4 illustrates an example of files to be displayed on a terminal apparatus.

A specific example of the operation state of the terminal apparatus 4 will now be described. FIG. 4 illustrates an example of a file being displayed on the UI unit 44 of the terminal apparatus 4. For example, a controller 41 of the terminal apparatus 4 activates document creation application software, and a user creates and edits a document using the UI unit 44. A user interface 100 displayed on the UI unit 44 includes, as an example, a display area 110 where the name of the document is displayed, scroll operation portions 120 and 140 used to scroll the document to change over pages, and a display area 130 where the document is displayed. In this manner, when a file is being displayed on the UI unit 44, operation state information indicating the content of "currently displaying a file" is transmitted from the terminal apparatus 4 to the image processing apparatus 2.

Figure 5:
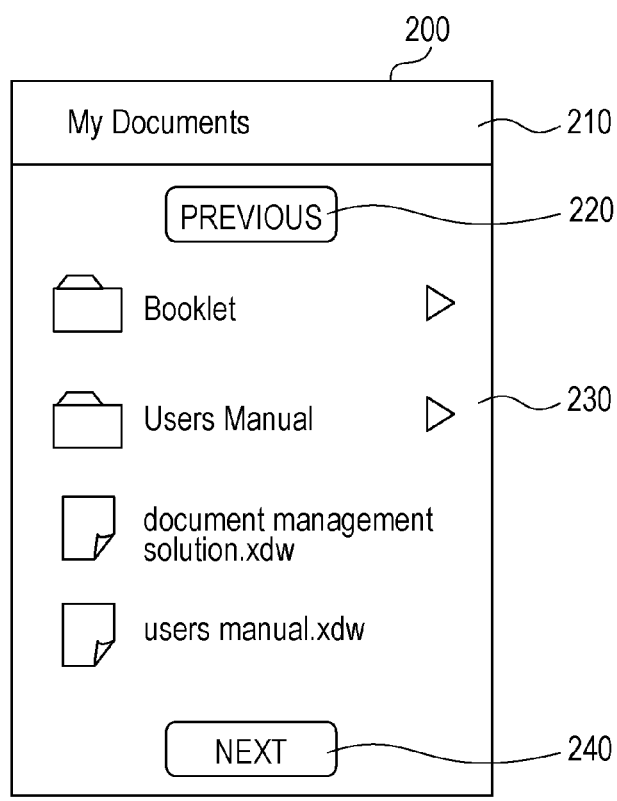
FIG. 5 illustrates an example of folders to be displayed on a terminal apparatus.

FIG. 5 illustrates an example of a folder to be displayed on the UI unit 44 of the terminal apparatus 4. For example, the controller 41 activates data management application software, and a user specifies a folder or a file using the UI unit 44. A user interface 200 displayed on the UI unit 44 includes, as an example, a display area 210 where the name of the folder is displayed, scroll operation portions 220 and 240 used to display another folder, and a display area 230 where data in the folder or a sub-folder in the folder is displayed. In this manner, when a folder is being displayed on the UI unit 44, operation state information indicating the content of "currently displaying a folder" is transmitted from the terminal apparatus 4 to the image processing apparatus 2.

Specific Information Provided from Image Processing Apparatus 2 to Terminal Apparatus 4

Next, a description will be made of specific information to be provided from the image processing apparatus 2 to the terminal apparatus 4. The specific information may be, for example, data of a setting UI for allowing a user to set the operating conditions of the function (image processing) of the image processing apparatus 2 using the terminal apparatus 4, or may be address data for accessing the setting UI. More specifically, the specific information may be data or address data of a setting UI for allowing a user to set, using the terminal apparatus 4, the operation conditions of the function of the image processing apparatus 2 which is expected to be executed in connection with the operation state of the terminal apparatus 4. For example, the controller 25 selects plural functions of the image processing apparatus 2 while assigning priorities to the plural functions in accordance with the operation state of the terminal apparatus 4, and controls the transmitting and receiving unit 26 to provide the terminal apparatus 4 with the data or address data of the setting UI used to set the operation conditions of the individual functions in descending order of priority.

Examples of the functions of the image processing apparatus 2 include an image reading function performed by the image reading unit 21, a printing function performed by the printing unit 22, and a facsimile transmission function performed by the facsimile transmission unit 23. The controller 25 controls the transmitting and receiving unit 26 to provide the terminal apparatus 4 with data or address data of a setting UI used to set the operation conditions of the image reading unit 21, the printing unit 22, the facsimile transmission unit 23, or any other desired unit in descending order of priority.

The priority of each individual function represents, for example, how probable it is that the function will be executed after the operation being performed by the terminal apparatus 4 is completed. That is, a function having a relatively high probability of being executed after the operation being performed by the terminal apparatus 4 is completed is assigned a relatively high priority, and a function having a relatively low probability of being executed after the operation being performed by the terminal apparatus 4 is completed is assigned a relatively low priority. The priority of each individual function may be determined in advance on the basis of, for example, the frequency with which the function has been previously executed. The controller 25 controls the transmitting and receiving unit 26 to provide the terminal apparatus 4 with the data or address data of setting UIs in descending order of probability of the functions being executed (i.e., in descending order of priority).

The functions of the image processing apparatus 2 corresponding to operation states will be described with reference to FIG. 6. FIG. 6 illustrates an example of functions corresponding to operation states. For example, if the operation state of the terminal apparatus 4 is "currently displaying a file" or "currently displaying a web page", the probability of the "(1) File to Printing" function being executed after a file or a web page is displayed is the highest, the probability of the "(2) File to Email" function being executed is the second highest, the probability of the "(3) File to Facsimile transmission" function being executed is the third highest, and the probability of the "(4) Display of a List of functions" function being executed is the fourth highest. Here, the "(1) File to Printing" function is a function for executing a series of processes in which the image processing apparatus 2 acquires input or output data of a specified file and the printing unit 22 prints an image on a sheet based on the input or output data. The "(2) File to Email" function is a function for executing a series of processes in which the image processing apparatus 2 acquires specified input or output data and transmits the acquired input or output data to a specified address via email. The "(3) File to Facsimile transmission" function is a function for executing a series of processes in which the image processing apparatus 2 acquires input or output data of a specified file and the facsimile transmission unit 23 transmits an image based on the acquired input or output data to a specified destination via facsimile. The "(4) Display of a List of functions" function is a function for displaying a list of functions of the image processing apparatus 2 on the terminal apparatus 4.

For example, upon detecting, based on the operation state information, that the operation state of the terminal apparatus 4 is "currently displaying a file" or "currently displaying a web page", the controller 25 selects the "(1) File to Printing" function as the highest priority function, the "(2) File to Email" function as the second highest priority function, the "(3) File to Facsimile transmission" function as the third highest priority function, and the "(4) Display of a List of functions" function as the fourth highest priority function. Then, the controller 25 controls the transmitting and receiving unit 26 to provide the terminal apparatus 4 in the first place with data or address data of a setting UI used to set the operation conditions of the highest priority "(1) File to Printing" function, controls the transmitting and receiving unit 26 to provide the terminal apparatus 4 in the second place with data or address data of a setting UI used to set the operation conditions of the second highest priority "(2) File to Email" function, controls the transmitting and receiving unit 26 to provide the terminal apparatus 4 in the third place with data or address data of a setting UI used to set the operation conditions of the third highest priority "(3) File to Facsimile transmission" function, and controls the transmitting and receiving unit 26 to provide the terminal apparatus 4 in the fourth place with data or address data of a setting UI of the fourth highest priority "(4) Display of a List of functions" function. In this manner, the controller 25 controls the transmitting and receiving unit 26 to provide the terminal apparatus 4 with data or address data of setting UIs used to set the operation conditions of the respective functions in descending order of priority.

In addition, for example, if the operation state of the terminal apparatus 4 is "currently displaying a folder", the probability of the "(1) Scanning to Folder" function being executed after a folder is displayed is the highest, the probability of the "(2) Acquisition of Box document to Terminal apparatus" function being executed is the second highest, and the probability of the "(3) Display of a List of functions" function being executed is the third highest. Here, the "(1) Scanning to Folder" function is a function for executing a series of processes in which the image reading unit 21 reads an image on a document to generate input or output data and the image processing apparatus 2 outputs the generated input or output data to a specified folder to store the input or output data in the folder. A "box operation" function, which is associated with the "Acquisition of Box document" function, is a function for saving input or output data in the storage unit 27 of the image processing apparatus 2 and a function for acquiring input or output data from the storage unit 27 of the image processing apparatus 2. The "(2) Acquisition of Box document to Terminal apparatus" function is a function for executing a series of processes in which the image processing apparatus 2 transmits input or output data stored in the storage unit 27 to the terminal apparatus 4 and the terminal apparatus 4 acquires the input or output data.

For example, upon detecting, based on the operation state information, that the operation state of the terminal apparatus 4 is "currently displaying a folder", the controller 25 selects the "(1) Scanning to Folder" function having the highest priority as the highest priority function, the "(2) Acquisition of Box document to Terminal apparatus" function as the second highest priority function, and the "(3) Display of a List of functions" function as the third highest priority function. Then, the controller 25 controls the transmitting and receiving unit 26 to provide the terminal apparatus 4 with data or address data of setting UIs used to set the operation conditions of the respective functions in descending order of priority.

In addition, for example, if the operation state of the terminal apparatus 4 is "currently creating an email", the probability of the "(1) File to Email" function being executed after an email is created is the highest, the probability of the "(2) Acquisition of Box document to Terminal apparatus" function being executed is the second highest, and the probability of the "(3) Display of a List of functions" function being executed is the third highest. Upon detecting, based on the operation state information, that the operation state of the terminal apparatus 4 is "currently creating an email", the controller 25 selects the "(1) File to Email" function having the highest priority as the highest priority function, the "(2) Acquisition of Box document to Terminal apparatus" function as the second highest priority function, and the "(3) Display of a List of functions" function as the third highest priority function. Then, the controller 25 controls the transmitting and receiving unit 26 to provide the terminal apparatus 4 with data or address data of setting UIs used to set the operation conditions of the respective functions in descending order of priority.

Further, for example, if the operation state of the terminal apparatus 4 is "currently displaying a destination", the probability of the "(1) File to Email" function being executed after a destination is displayed is the highest, the probability of the "(2) File to Facsimile transmission" function being executed is the second highest, and the probability of the "(3) Display of a List of functions" function being executed is the third highest. Upon detecting, based on the operation state information, that the operation state of the terminal apparatus 4 is "currently displaying a destination", the controller 25 selects the "(1) File to Email" function having the highest priority as the highest priority function, the "(2) File to Facsimile transmission" function as the second highest priority function, and the "(3) Display of a List of functions" function as the third highest priority function. Then, the controller 25 controls the transmitting and receiving unit 26 to provide the terminal apparatus 4 with data or address data of setting UIs used to set the operation conditions of the respective functions in descending order of priority.

A table in which the functions assigned priorities and operation states are associated with each other may be created in advance, and may be stored in the storage unit 27 in advance. As an example, the table representing the correspondence relationships illustrated in FIG. 6 may be created in advance and is stored in the storage unit 27 in advance. The priority of each individual function may be determined on the basis of, for example, the frequency with which the function has been previously executed. The controller 25 refers to the table stored in the storage unit 27 to select plural functions corresponding to the operation state of the terminal apparatus 4 while assigning priorities to the plural functions, and controls the transmitting and receiving unit 26 to provide the terminal apparatus 4 with the data or address data of setting UIs used to set the operation conditions of the selected functions in descending order of priority.

The controller 25 may control the transmitting and receiving unit 26 to provide the terminal apparatus 4 with only the highest priority specific information. The controller 25 may also assign priority information to plural pieces of data or address data of setting UIs, and control the transmitting and receiving unit 26 to provide the terminal apparatus 4 collectively with the plural pieces of data or address data of the setting UIs. In this case, the terminal apparatus 4 interprets the priority information assigned to the individual pieces of data or address data of the setting UIs, and displays the setting UIs in accordance with the priorities.

A setting UI for each function may include a field where a user inputs an output destination or acquisition source of input or output data to be subjected to image processing using the terminal apparatus 4. The output destination may be a location (e.g., address) to which the image processing apparatus 2 outputs the input or output data subjected to image processing. The acquisition source may be a location where input or output data to be subjected to image processing is stored (or contained), and the image processing apparatus 2 acquires the input or output data to be subjected to image processing from the acquisition source. The output destination and acquisition source of input or output data will be described with reference to FIG. 7. FIG. 7 illustrates correspondence relationships between the content of image processing and the output destination or acquisition source of input or output data. For example, if the function to be executed by the image processing apparatus 2 is "File to Printing", the image processing apparatus 2 acquires and prints specified input or output data. Thus, the "acquisition source" corresponds to the location where the input or output data is reflected. In addition, if the function to be executed by the image processing apparatus 2 is "File to Email", the image processing apparatus 2 acquires specified input or output data, and transmits the acquired input or output data via email. Thus, "acquisition source" corresponds to the location where the input or output data is reflected. If the function to be executed by the image processing apparatus 2 is "File to Facsimile transmission", the image processing apparatus 2 acquires specified input or output data, and transmits the acquired input or output data via facsimile. Thus, "acquisition source" corresponds to the location where the input or output data is reflected. Further, if the function to be executed by the image processing apparatus 2 is "Scanning to Folder", the image processing apparatus 2 reads an image to generate input or output data, and outputs the generated input or output data to a specified folder to store the input or output data in the folder. Thus, "output destination (storage location)" corresponds to the location where the input or output data is reflected. Furthermore, if the function to be executed by the image processing apparatus 2 is "Scanning to DMS", the image processing apparatus 2 reads an image to generate input or output data, and outputs the generated input or output data to a specified DMS, or document management system, to store the input or output data in the DMS. Thus, "output destination (storage location)" corresponds to the location where the input or output data is reflected. The output destination or acquisition source of input or output data is automatically set, in the terminal apparatus 4, on a setting UI in accordance with the operation state of the terminal apparatus 4, which will be described below.

The controller 25 receives control data (command data) transmitted from the terminal apparatus 4, and controls the operation of the image reading unit 21, the printing unit 22, the facsimile transmission unit 23, or any other desired unit in accordance with the control data. The control data may be data indicating a command concerning image processing to be performed by the image processing apparatus 2, and may be, for example, data indicating the operating conditions of an operation such as reading an image, printing an image, or transmitting image data via facsimile. The control data may also include input source or output destination information indicating the output destination (storage location) or acquisition source of input or output data. The control data may include, for example, information concerning image reading conditions, such as resolution, density, monochrome/color selection, the document size, the file name of generated input or output data, and the output destination (storage location) of input or output data, when an image is to be read by the image reading unit 21. When printing is to be performed by the printing unit 22, the control data may include information concerning printing conditions, such as resolution, density, monochrome/color selection, paper size, the number of copies to be printed, the file name of input or output data to be printed, and the acquisition source of input or output data. When facsimile transmission is to be performed by the facsimile transmission unit 23, the control data may include information concerning facsimile transmission conditions, such as resolution, density, the telephone number of the transmission destination, the file name of input or output data to be transmitted, and the acquisition source of input or output data. For example, the controller 25 receives a hypertext transfer protocol (HTTP) request transmitted from the terminal apparatus 4, analyzes the content of the request, and controls the operation of the image reading unit 21, the printing unit 22, the facsimile transmission unit 23, or any other desired unit.

Figure 8A:
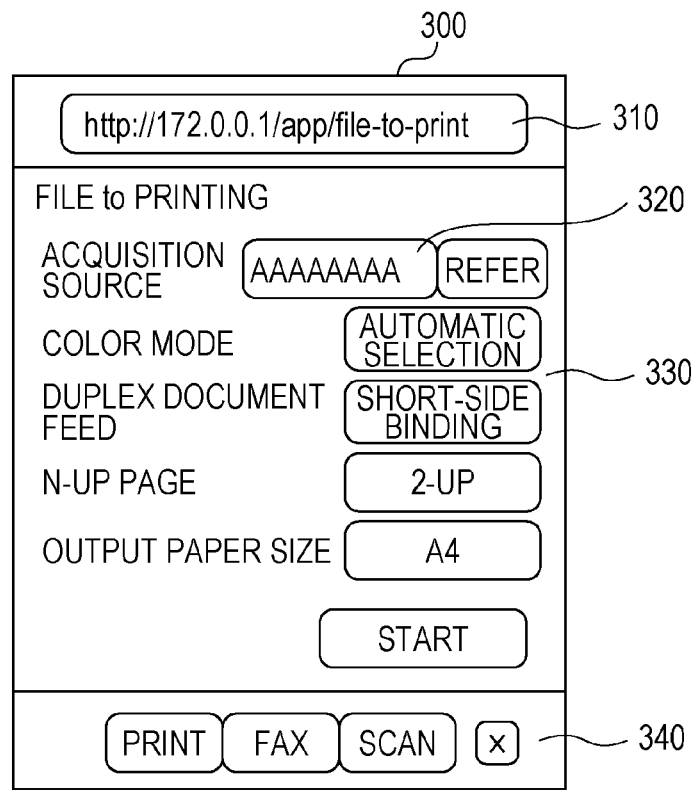
FIGS. 8A and 8B illustrate an example of a setting user interface corresponding to an operation state.

Here, a specific example of a setting UI to be displayed on the UI unit 44 of the terminal apparatus 4 will be described. FIG. 8A illustrates an example of a setting UI 300 used to set the operation conditions of the "File to Printing" function. The setting UI 300 may be a screen for allowing a user to set the operation conditions of the printing unit 22 of the image processing apparatus 2 using the terminal apparatus 4. The setting UI 300 includes, as an example, a display area 310 where address data (URL) is displayed, an input source or output destination information field 320 used to input the acquisition source of the input or output data to be printed, a display area 330 where items for printing settings are displayed, and a display area 340 where setting UIs selected by a user are switched over. The display area 330 includes fields used to input printing settings, such as color mode, simplex/duplex printing, and output paper size. The information input by the user on the setting UI 300 is included in the control data. When the user selects the "Start" button, the transmitting and receiving unit 43 of the terminal apparatus 4 transmits the control data to the image processing apparatus 2 via the communication path 5 as an HTTP request. The image processing apparatus 2 acquires input or output data from the acquisition source input in the input source or output destination information field 320, and performs printing. For example, the controller 25 of the image processing apparatus 2 interprets the content of the HTTP request, and controls the transmitting and receiving unit 26 to acquire input or output data from the acquisition source input in the input source or output destination information field 320. The controller 25 further controls the printing unit 22 to perform printing based on the acquired input or output data.

Figure 9A:
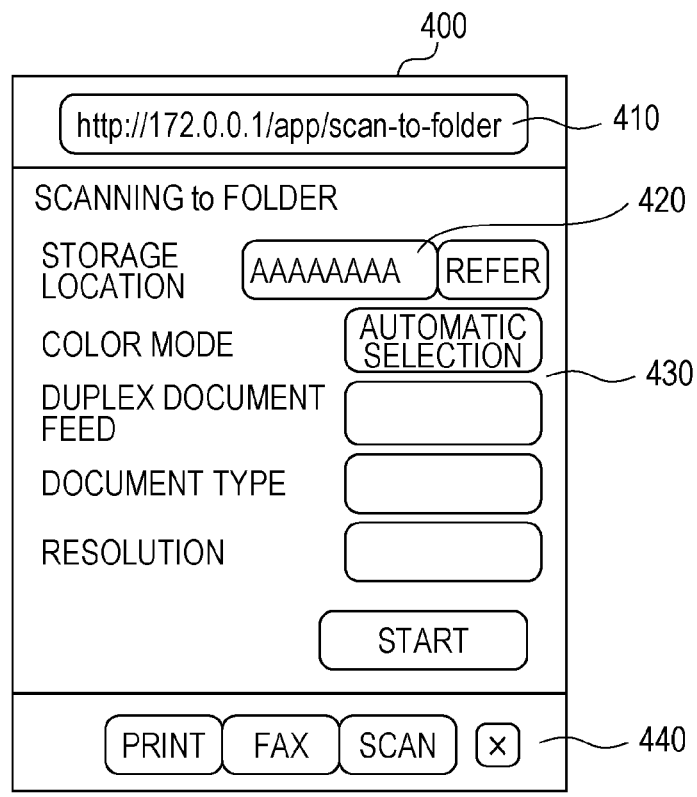
FIGS. 9A and 9B illustrate an example of a setting user interface corresponding to an operation state.

FIG. 9A illustrates an example of a setting UI 400 for setting the operation conditions of the "Scanning to Folder" function. The setting UI 400 may be a screen for allowing a user to set the operation conditions of the image reading unit 21 using the terminal apparatus 4. The setting UI 400 includes, as an example, a display area 410 where address data (URL) is displayed, an input source or output destination information field 420 used to input the storage location (output destination) of the input or output data generated by reading an image, a display area 430 where items for image reading settings are displayed, and a display area 440 where setting UIs selected by a user are switched over. The display area 430 includes fields used to input scanning settings, such as color mode, resolution, and document type. The information input by the user on the setting UI 400 is included in the control data. When the user presses the "Start" button, the transmitting and receiving unit 43 of the terminal apparatus 4 transmits the control data to the image processing apparatus 2 via the communication path 5 as an HTTP request. The image processing apparatus 2 reads an image to generate input or output data, and outputs the input or output data to the storage location (output destination) input in the input source or output destination information field 420. For example, the controller 25 of the image processing apparatus 2 interprets the content of the HTTP request, and controls the image reading unit 21 to read an image. The controller 25 further controls the transmitting and receiving unit 26 to output the input or output data generated by the image reading unit 21 to the storage location (output destination) input in the input source or output destination information field 420.

Transmitting and Receiving Unit 26

The transmitting and receiving unit 26 of the image processing apparatus 2 receives request information indicating a request for specific information and operation state information indicating the operation state of the terminal apparatus 4 from the terminal apparatus 4 via the communication path 5, and outputs the request information and the operation state information to the controller 25. Further, the transmitting and receiving unit 26 transmits data of a setting UI to the terminal apparatus 4 via the communication path 5. For example, the transmitting and receiving unit 26 transmits plural pieces of data of setting UIs to the terminal apparatus 4 in descending order of priority, in accordance with control of the controller 25.

Alternatively, the transmitting and receiving unit 26 may transmit address data for allowing the terminal apparatus 4 to access data of a setting UI via the communication path 5 to the terminal apparatus 4 via the communication path 5. For example, the transmitting and receiving unit 26 may transmit plural pieces of address data of setting UIs to the terminal apparatus 4 in descending order of priority, in accordance with control of the controller 25. As an example, the transmitting and receiving unit 26 may transmit address data of a setting UI in a LAN or a WAN to the terminal apparatus 4 via the communication path 5. When the terminal apparatus 4 accesses the data of the setting UI via the communication path 5 using the address data, the transmitting and receiving unit 26 transmits the data of the setting UI to the terminal apparatus 4 via the communication path 5.

In addition, the transmitting and receiving unit 26 receives control data (command data) as an HTTP request from the terminal apparatus 4 via the communication path 5, and transmits the input or output data generated by the image reading unit 21 to the terminal apparatus 4 via the communication path 5 as an HTTP response in response to the HTTP request.

The image processing apparatus 2 and the terminal apparatus 4 may be connected to each other via two communication paths, that is, the communication path 5 and the different communication path described above. For example, the transmitting and receiving unit 26 may receive request information and operation state information from the terminal apparatus 4 via the different communication path, and may transmit address data of a setting UI to the terminal apparatus 4 via the different communication path. For example, if the different communication path is a communication path based on wireless data communication such as IrDA or Bluetooth (registered trademark) data communication, the transmitting and receiving unit 26 communicate with the transmitting and receiving unit 43 of the terminal apparatus 4 through infrared or radio transmission and reception between the transmitting and receiving unit 26 and the transmitting and receiving unit 43, and receives request information and operation state information from the transmitting and receiving unit 43 via the different communication path. The transmitting and receiving unit 26 transmits plural pieces of address data of setting UIs to the transmitting and receiving unit 43 via the different communication path in descending order of priority. When the transmitting and receiving unit 43 of the terminal apparatus 4 accesses data of a setting UI via the communication path 5 using address data transmitted from the image processing apparatus 2, the transmitting and receiving unit 26 transmits the data of the setting UI to the terminal apparatus 4 via the communication path 5. In this way, the terminal apparatus 4 may transmit request information and operation state information to the image processing apparatus 2 via a communication path different from the communication path 5, and the image processing apparatus 2 may transmit plural pieces of address data of setting UIs to the terminal apparatus 4 via the different communication path in descending order of priority, and transmit data of the setting UIs to the terminal apparatus 4 via the communication path 5.

In addition, the transmitting and receiving unit 26 is connected to the file server 6, the DMS 7, the directory server 8, or the mail server 9 via the communication path 5 to transmit input or output data to the file server 6 or the like or acquire input or output data from the file server 6 or the like.

Storage Unit 27

The storage unit 27 stores correspondence relationship information indicating correspondence relationships between operation states of the terminal apparatus 4 and plural pieces of specific information assigned priorities. As an example, the storage unit 27 stores the table illustrated in FIG. 6. The storage unit 27 further stores input or output data generated by the image reading unit 21, input or output data to be printed, which has been transmitted from the terminal apparatus 4, input or output data to be transmitted via facsimile, control data (command data), and so forth.

UI Unit 28

The UI unit 28 has a display, and displays, for example, a user interface provided from the UI providing unit 24. The UI unit 28 receives input of control data from a user regarding the operating conditions of an operation such as reading an image, printing an image, transmitting image data via facsimile, transmitting image data via email, or box operation.

Next, the terminal apparatus 4 will be described. As an example, the terminal apparatus 4 includes a controller 41, the operation state acquisition unit 42, the transmitting and receiving unit 43, the user interface unit (or UI unit) 44, and the storage unit 45.

Controller 41

The controller 41 executes application software specified by a user. For example, the controller 41 executes application software such as application software relating to a viewer, data management application software, email application software, application software relating to an address book, application software relating to a web browser, map application software, or authoring application software. The application software described above may be stored in, for example, the storage unit 45 in advance, or may be transmitted from an external device to the terminal apparatus 4 via communication or the like.

Further, upon receiving from a user an instruction to acquire specific information relating to an operation being performed by the terminal apparatus 4, the controller 41 requests the operation state acquisition unit 42 to acquire the operation state of the terminal apparatus 4. The controller 41 receives operation state information indicating the operation state of the terminal apparatus 4 from the operation state acquisition unit 42, and controls the transmitting and receiving unit 43 to transmit request information indicating a request for specific information and the operation state information to the image processing apparatus 2. The controller 41 may add the operation state information to the request information.

Further, the controller 41 receives the data or address data of the setting UI transmitted from the image processing apparatus 2, and causes the setting UI or address data to be displayed on the UI unit 44. The controller 41 may cause plural pieces of address data to be displayed in list form on the UI unit 44, or may cause the plural pieces of address data to be displayed on the UI unit 44 in descending order of priority in accordance with the operation state. For example, the controller 41 may cause the plural pieces of address data to be displayed on the UI unit 44 as thumbnail images (small images), or may cause the plural pieces of address data to be displayed on the UI unit 44 in descending order of priority in accordance with an instruction from the user. The controller 41 may also cause plural setting UIs to be displayed on the UI unit 44 in descending order of priority.

Further, the controller 41 acquires input source or output destination information that indicates the output destination (storage location) or acquisition source of input or output data and that corresponds to the operation state of the terminal apparatus 4. For example, the controller 41 causes the input source or output destination information corresponding to the operation state to be displayed in an input source or output destination information field on the setting UI displayed on the UI unit 44 which is used to enter input source or output destination information.

Operation State Acquisition Unit 42

The operation state acquisition unit 42 detects the state of the operation being performed by the terminal apparatus 4, and outputs operation state information indicating the operation state to the controller 41. For example, the operation state acquisition unit 42 detects the type of the application software operating on the controller 41 or detects the operation being performed using the operating application software.

For example, if the operation state is defined on the basis of the level A illustrated in FIG. 2, a map illustrated in FIG. 2 in which the values of the operation states and the names of application software are associated with each other is created in advance, and is stored in the storage unit 45 in advance. The operation state acquisition unit 42 acquires the name of the application software operating on the terminal apparatus 4 from the controller 41, and refers to the map described above to acquire the value of the operation state corresponding to the operating application software. For example, if application software relating to a viewer is being executed by the controller 41, the operation state acquisition unit 42 acquires the name of the application software relating to the viewer from the controller 41, and refers to the map described above to acquire the value ("viewer") of the operation state. If data management application software for managing files and folders is being executed by the controller 41, the operation state acquisition unit 42 acquires the name of the data management application software from the controller 41, and refers to the map described above to acquire the value ("data management application") of the operation state.

If the operation state is defined on the basis of the level B illustrated in FIG. 2, the operation state acquisition unit 42 detects the state of the operation being performed using the application software operating on the terminal apparatus 4. For example, if map application software has been executed by the controller 41 and a map of the area XXX is being displayed on the UI unit 44, the operation state acquisition unit 42 detects the operation state indicating "a map of the area XXX is being displayed". If authoring application software has been executed by the controller 41 and an image is being displayed on the UI unit 44, the operation state acquisition unit 42 detects the operation state indicating "an image is being displayed". As an example, the operation state acquisition unit 42 may detect the operation state of the terminal apparatus 4 in accordance with the standard of the level A or the standard of the level B.

Here, correspondence relationships between operation states of the terminal apparatus 4 and input source or output destination information will be described with reference to FIG. 10. FIG. 10 illustrates correspondence relationships between operation states of the terminal apparatus and input source or output destination information. The controller 41 receives operation state information from the operation state acquisition unit 42, and acquires input source or output destination information indicating the output destination (storage location) or acquisition source corresponding to the operation state indicated by the operation state information. For example, if the operation state indicates "currently displaying a file on the viewer", the input source or output destination information is the local path of the file being displayed on the viewer or the external address of the file being displayed on the viewer (the address of the file in an external device), and the controller 41 acquires input source or output destination information by, for example, checking the process and the file handle. Examples of the external device may include the file server 6, the DMS 7, the directory server 8, and the mail server 9. If plural files are being displayed, the controller 41 selects the local path or external address of an active file that is being displayed on a window as a specified value or the highest priority value, and the local paths or external addresses of the other files as option values. The term "active file" means, for example, a file being operated on by the user.

If the operation state indicates "currently displaying a folder on the viewer", the input source or output destination information is the local path of external address of the folder being displayed on the viewer, and the controller 41 acquires input source or output destination information by, for example, checking the process and the file handle. If plural folders are being displayed, the controller 41 selects the local path or external address of an active folder as a specified value or the highest priority value, and the local paths or external addresses of the other folders as option values. The term "active folder" means, for example, a folder being operated on by the user.

If the operation state indicates "currently displaying a file on the web browser", the input source or output destination information is the local path or external address of the file being displayed on the web browser, and the controller 41 acquires input source or output destination information by checking the process and the file handle. If plural files are being displayed, the controller 41 selects the local path or external address of an active file that is being displayed on a window as a specified value or the highest priority value, and the local paths or external addresses of the other files as option values.

If the operation state indicates "currently displaying a web page on the web browser", the input source or output destination information is the external address of the web page being displayed on the web browser, and the controller 41 acquires input source or output destination information from the web browser by checking the process. If plural web pages are being displayed, the controller 41 selects the external address of an active web page that is being displayed on a window as a specified value or the highest priority value, and the external addresses of the other web pages as option values. The term "active web page" means, for example, a web page being operated by the user.

Then, the controller 41 causes the input source or output destination information such as the selected local path or external address to be displayed in the input source or output destination information field used to enter input source or output destination information on the setting UI displayed on the UI unit 44. For example, if plural files, plural folders, or plural web pages are being displayed on the UI unit 44, the controller 41 acquires plural pieces of input source or output destination information, and displays the plural pieces of input source or output destination information in the input source or output destination information field on the setting UI in such a manner as to allow the user to select any of them. The controller 41 may also display the piece of input source or output destination information associated with the specified value or the highest priority value in the input source or output destination information field on the setting UI, and display the other pieces of input source or output destination information in the input source or output destination information field on the setting UI in such a manner as to allow the user to select any of them.

The location where input or output data is reflected will now be described with reference to FIG. 11. For example, if the object being operated on the terminal apparatus 4 is the "file being displayed on the viewer", the location where input or output data of the file being displayed is reflected is the "acquisition source", and the controller 41 displays (A) the local path or external address of an active file as a specified value or the highest priority option in the input source or output destination information field on the setting UI, and (B) the local paths or external addresses of non-active files as options in the input source or output destination information field on the setting UI. That is, if the operation state indicates that a file is being displayed, as illustrated in FIG. 6, a suitable function such as "File to Printing", "File to Email", or "File to Facsimile transmission" is selected, and the image processing apparatus 2 acquires the input or output data of the specified file and performs image processing on the acquired input or output data. Thus, the location where input or output data is reflected is the "acquisition source".

If the object being operated on the terminal apparatus 4 is the "folder being displayed on the viewer", the location where input or output data is reflected is the "output destination (storage location)", and the controller 41 displays (A) the local path or external address of an active folder as a specified value or the highest priority option in the input source or output destination information field on the setting UI, and (B) the local paths or external addresses of non-active folders as options in the input source or output destination information field on the setting UI. That is, as illustrated in FIG. 6, if a folder is being displayed and the "Scanning to Folder" function is selected, the image processing apparatus 2 outputs the input or output data generated by reading an image to the specified folder. Thus, the location where input or output data is reflected is the "output destination (storage location)".

If the object on which the terminal apparatus 4 will perform an operation is the "web page being displayed on the web browser", the location where input or output data is reflected is the "acquisition source", and the controller 41 displays (A) the external address of an active web page as a specified value or the highest priority option in the input source or output destination information field on the setting UI, and (B) the external addresses of non-active web pages as options in the input source or output destination information field on the setting UI. That is, if the operation state indicates that a web page is being displayed, as illustrated in FIG. 6, a suitable function such as "File to Printing", "File to Email", or "File to Facsimile transmission" is selected, and the image processing apparatus 2 acquires the data of the specified web page and performs image processing on the acquired data. Thus, the location where input or output data is reflected is the "acquisition source".

Figure 8B:
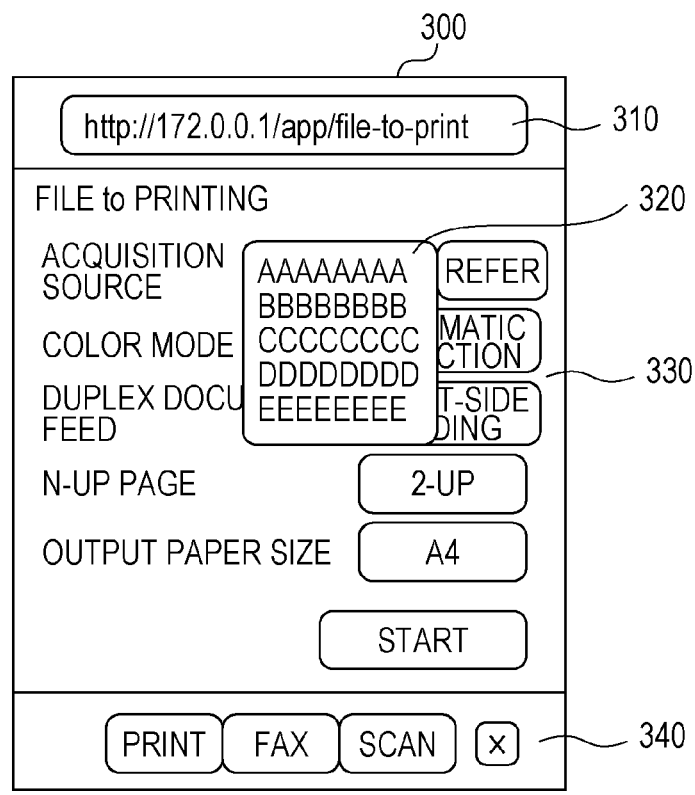

A description will be given of a specific example when the operation state indicates "currently displaying a file" and the "File to Printing" function is selected using the terminal apparatus 4. The controller 41 causes, for example, the setting UI 300 illustrated in FIG. 8A to be displayed on the UI unit 44, and causes input source or output destination information indicating the acquisition source of the input or output data to be displayed in the input source or output destination information field 320 on the setting UI 300. The controller 41 acquires the local path or external address of the file being displayed on the UI unit 44, and displays the local path or external address (e.g., "AAAAAAAA") of the active file as a specified value or the highest priority option in the input source or output destination information field 320. The controller 41 may also cause the local paths or external addresses of non-active files to be displayed as options in the input source or output destination information field 320. For example, as illustrated in FIG. 8B, the controller 41 may also cause the local paths or external addresses (e.g., "BBBBBBBB", "CCCCCCCC", etc.) of non-active files to be displayed in the input source or output destination information field 320 in pull-down form.

Figure 9B:
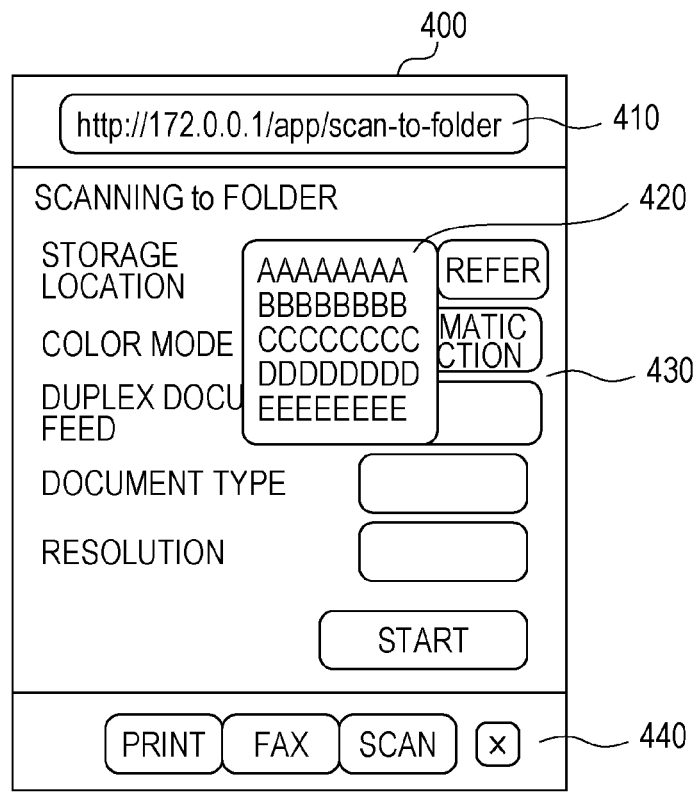

If the operation state indicates "currently displaying a folder" and the "Scanning to Folder" function is selected using the terminal apparatus 4, the controller 41 causes, for example, the setting UI 400 illustrated in FIG. 9A to be displayed on the UI unit 44, and causes input source or output destination information indicating the storage location (output destination) of the input or output data to be displayed in the input source or output destination information field 420 on the setting UI 400. The controller 41 acquires the local path or external address of the folder being displayed on the UI unit 44, and causes the local path or external address (e.g., "AAAAAAAA") of the active folder to be displayed as a specified value or the highest priority option in the input source or output destination information field 420. The controller 41 may also cause the local paths or external addresses of non-active folders as options in the input source or output destination information field 420. For example, as illustrated in FIG. 9B, the controller 41 may also cause the local paths or external addresses (e.g., "BBBBBBBB", "CCCCCCCC", etc.) of non-active folders to be displayed in the input source or output destination information field 420 in pull-down form.

Transmitting and Receiving Unit 43

The transmitting and receiving unit 43 transmits request information indicating a request for specific information and operation state information indicating the operation state of the terminal apparatus 4 to the image processing apparatus 2 via the communication path 5.

Further, the transmitting and receiving unit 43 receives address data of a setting UI from the image processing apparatus 2 via the communication path 5. If plural pieces of address data of setting UIs have been transmitted from the image processing apparatus 2 in descending order of priority, the transmitting and receiving unit 43 sequentially receives the plural pieces of address data. The plural pieces of address data received by the transmitting and receiving unit 43 are stored in the storage unit 45 of the terminal apparatus 4. In addition, as described above, if the image processing apparatus 2 and the terminal apparatus 4 are connected to each other via two communication paths, that is, the communication path 5 and the different communication path described above, the transmitting and receiving unit 43 may transmit the request information and the operation state information to the image processing apparatus 2 via the different communication path, and receive address data of a setting UI from the image processing apparatus 2 via the different communication path.

The transmitting and receiving unit 43 further receives data of the setting UI from the image processing apparatus 2 via the communication path 5. For example, a program of the web browser may be stored in the storage unit 45 in advance. When a user gives an instruction to activate the web browser by using the UI unit 44, the controller 41 activates the web browser in accordance with the instruction given from the user. Then, the transmitting and receiving unit 43 accesses the data of the setting UI via the communication path 5 using the address data specified by the user. After that, the data of the setting UI is provided from the UI providing unit 24 of the image processing apparatus 2 to the UI unit 44 of the terminal apparatus 4 through the transmitting and receiving unit 26 of the image processing apparatus 2, the communication path 5, and the transmitting and receiving unit 43 of the terminal apparatus 4. The web browser of the terminal apparatus 4 displays the setting UI received from the image processing apparatus 2. Further, if the transmitting and receiving unit 43 has received address data from the image processing apparatus 2, the controller 41 may automatically activate the web browser without waiting for an instruction to be given from a user, and the transmitting and receiving unit 43 may access the data of the setting UI via the communication path 5 by using the address data. For example, the transmitting and receiving unit 43 may access the data of the setting UI via the communication path 5 by using the highest priority address data without waiting for an instruction to be given from the user.

Also when the setting UI is not a user interface displayed in the web browser but a user interface displayed on the terminal apparatus 4 in accordance with a specific computer program, the transmitting and receiving unit 43 receives the data of the setting UI from the image processing apparatus 2 via the communication path 5.

In addition, the transmitting and receiving unit 43 transmits the control data as an HTTP request to the image processing apparatus 2 via the communication path 5. If printing or facsimile transmission is to be performed based on the input or output data stored in the terminal apparatus 4, the transmitting and receiving unit 43 transmits the input or output data for which printing or facsimile transmission is to be performed to the image processing apparatus 2 via the communication path 5. If the image processing apparatus 2 is to read an image and the terminal apparatus 4 is to acquire input or output data, the transmitting and receiving unit 43 receives input or output data generated by the image reading unit 21 from the image processing apparatus 2 via the communication path 5 as an HTTP response to the HTTP request.

UI Unit 44

The UI unit 44 has a display, and displays a setting UI or address data. Further, the UI unit 44 receives an instruction from the user to acquire specific information and receives address data specified by a user. For example, a user specifies, using the UI unit 44, address data of a setting UI used to set the operating conditions of the function (image processing) that the user wishes to execute among plural pieces of address data being displayed on the UI unit 44. The UI unit 44 further receives input of the control data from a user regarding the operating conditions of an operation such as reading an image, printing an image, transmitting image data via facsimile, transmitting image data via email, or box operation.
Storage Unit 45

The storage unit 45 stores input or output data. For example, the storage unit 45 stores input or output data generated by the image reading unit 21 of the image processing apparatus 2, and input or output data to be printed or transmitted via facsimile by the image processing apparatus 2. The storage unit 45 also stores application software to be executed by the controller 41. The storage unit 45 may further store plural pieces of data of plural setting UIs or plural pieces of address data which have been transmitted from the image processing apparatus 2.

Next, the operation of the image processing system 1 will be described with reference to FIG. 12. FIG. 12 is a sequence diagram illustrating an example of a processing procedure performed by the image processing system 1.

First, a user gives an instruction using the UI unit 44 of the terminal apparatus 4 to activate specific application software. Then, the controller 41 of the terminal apparatus 4 activates the application software specified by the user. The user uses the activated application software to create a document, display a file such as an image file or a document file on the UI unit 44, or display a folder on the UI unit 44.

When a user gives an instruction using the UI unit 44 of the terminal apparatus 4 to acquire specific information relating to an operation (S01), the controller 41 requests the operation state acquisition unit 42 to acquire an operation state (S02).

The operation state acquisition unit 42 detects the state of the operation being performed by the terminal apparatus 4 (step S03). For example, as illustrated in FIG. 4, if a file is being displayed on the UI unit 44, the operation state acquisition unit 42 detects the operation state indicating "currently displaying a file". As illustrated in FIG. 5, if a folder is being displayed on the UI unit 44, the operation state acquisition unit 42 detects the operation state indicating "currently displaying a folder".

Then, the transmitting and receiving unit 43 of the terminal apparatus 4 transmits the request information and the operation state information to the image processing apparatus 2 via the communication path 5 in accordance with a transmission instruction given from the user (S04). Alternatively, the transmitting and receiving unit 43 may transmit the request information and the operation state information to the image processing apparatus 2 via a communication path other than the communication path 5. The transmitting and receiving unit 26 of the image processing apparatus 2 receives the request information and the operation state information from the terminal apparatus 4 via the communication path 5 or another communication path, and outputs the request information and the operation state information to the controller 25. The transmitting and receiving unit 43 of the terminal apparatus 4 may transmit authentication information to the image processing apparatus 2, and the controller 25 of the image processing apparatus 2 may authenticate the terminal apparatus 4 using the authentication information.

The controller 25 selects plural pieces of specific information while assigning priorities to the plural pieces of specific information in accordance with the operation state indicated by the operation state information (SOS). For example, the controller 25 refers to the table illustrated in FIG. 6 to select plural functions while assigning priorities to the plural functions in accordance with the operation state. For example,
upon detecting that the operation state indicates "currently displaying a file", the controller 25 selects the "(1) File to Printing" function as the highest priority function, the "(2) File to Email" function as the second highest priority function, the "(3) File to Facsimile transmission" function as the third highest priority function, and the "(4) Display of a List of functions" function as the fourth highest priority function. Then, the controller 25 outputs the address data of the setting UI for setting the operation conditions of the selected function to the transmitting and receiving unit 26.

The transmitting and receiving unit 26 transmits the highest priority (top priority) specific information (address data of the setting UI) to the terminal apparatus 4 in the first place via the communication path 5 or another communication path (S06), the second highest priority specific information to the terminal apparatus 4 in the second place via the communication path 5 or another communication path, and the N-th highest priority specific information to the terminal apparatus 4 in the N-th place via the communication path 5 or another communication path (S07). Accordingly, the transmitting and receiving unit 26 transmits plural pieces of specific information selected by the controller 25 to the terminal apparatus 4 in descending order of priority.

The transmitting and receiving unit 43 of the terminal apparatus 4 receives the plural pieces of specific information from the image processing apparatus 2 via the communication path 5 or another communication path, and outputs the plural pieces of specific information, which are assigned priorities, to the controller 41 (S08). For example, the transmitting and receiving unit 43 receives plural pieces of address data setting UIs assigned priorities from the image processing apparatus 2 via the communication path 5 or another communication path, and outputs the plural pieces of address data to the controller 41.

The controller 41 causes the plural pieces of specific information acquired from the image processing apparatus 2 to be displayed on the UI unit 44 (S09). For example, the controller 41 may cause the plural pieces of address data to be displayed as thumbnail images on the UI unit 44, or may cause the plural pieces of address data to be displayed on the UI unit 44 in descending order of priority.

Then, the user activates the web browser on the terminal apparatus 4, and specifies a desired piece of address data among the plural pieces of address data being displayed on the UI unit 44 using the UI unit 44. The transmitting and receiving unit 43 accesses data of the setting UI via the communication path 5 using the address data specified by the user. After that, the data of the setting UI is provided from the UI providing unit 24 of the image processing apparatus 2 to the UI unit 44 of the terminal apparatus 4 through the transmitting and receiving unit 26, the communication path 5, and the transmitting and receiving unit 43.

In S06 and S07, instead of transmitting address data, the transmitting and receiving unit 26 may transmit plural pieces of data of setting UIs to the terminal apparatus 4 in descending order of priority. In this case, the controller 41 of the terminal apparatus 4 causes the plural setting UIs to be displayed on the UI unit 44 in descending order of priority.

As an example, if the user selects the File to Printing" function, the controller 41 causes, for example, the setting UI 300 illustrated in FIG. 8A to be displayed on the UI unit 44. If the user selects the "Scanning to Folder" function, the controller 41 causes, for example, the setting UI 400 illustrated in FIG. 9A to be displayed on the UI unit 44.

Then, the controller 41 of the terminal apparatus 4 acquires input source or output destination information in accordance with the operation state of the terminal apparatus 4 (S10). For example, as illustrated in FIG. 4, if a file is being displayed on the UI unit 44, the controller 41 acquires the local path or external address of the currently displayed file as input source or output destination information. If plural files are being displayed on the UI unit 44, the controller 41 selects the local path or external address of an active file that is being displayed on a window as a specified value or the highest priority value, and the local paths or external addresses of the other files as option values. Also if a folder or a web page is being displayed on the UI unit 44, the controller 41 acquires its local path or external address as input source or output destination information. Using the address of an active file, folder, or web page as a specified value or the highest priority value allows the address of the active file, folder, or web page to be selected preferentially and transmitted to the image processing apparatus 2.

The controller 41 causes the input source or output destination information to be displayed in the input source or output destination information field on the setting UI displayed on the UI unit 44 (S11). For example, if the "File to Printing" function is selected and the setting UI 300 illustrated in FIG. 8A is being displayed on the UI unit 44, the controller 41 causes input source or output destination information indicating the acquisition source of the input or output data to be displayed in the input source or output destination information field 320 on the setting UI 300. As an example, the controller 41 causes the local path or external address (e.g., "AAAAAAAA") of an active file to be displayed as a specified value or the highest priority value in the input source or output destination information field 320. Thus, the address of an active file may be selected preferentially and transmitted to the image processing apparatus 2. In addition, as illustrated in FIG. 8B, the controller 41 may also cause the local paths or external addresses (e.g., "BBBBBBBB", etc.) of non-active files to be displayed in the input source or output destination information field 320 in pull-down form.

Then, the user checks the input source or output destination information (output destination or acquisition source) being displayed in the input source or output destination information field on the setting UI, and instructs execution of image processing using the UI unit 44. If plural pieces of input source or output destination information are being displayed in the input source or output destination information field on the setting UI, the user selects a desired piece of input source or output destination information among the plural pieces of input source or output destination information using the UI unit 44, and instructs execution of image processing.

When input source or output destination information is specified and execution of image processing is instructed by the user, the transmitting and receiving unit 43 transmits control data including input source or output destination information indicating the output destination or acquisition source of the input or output data to the image processing apparatus 2 via the communication path 5 or another communication path (S12).

The controller 25 of the image processing apparatus 2 controls the operation of the image reading unit 21, the printing unit 22, the facsimile transmission unit 23, or any other desired unit in accordance with the control data transmitted from the terminal apparatus 4, and executes the image processing instructed by the terminal apparatus 4 (S13).

For example, if the setting UI 300 illustrated in FIG. 8B is being displayed on the UI unit 44, the user selects a desired piece of input source or output destination information (information indicating the location where the desired input or output data is stored) among the plural pieces of input source or output destination information using the UI unit 44, and instructs execution of the "File to Printing" function. Thus, the transmitting and receiving unit 43 transmits control data including input source or output destination information indicating the acquisition source of the input or output data and used to execute the "File to Printing" function to the image processing apparatus 2 via the communication path 5 or another communication path (S12). The controller 25 of the image processing apparatus 2 controls the transmitting and receiving unit 26 to acquire input or output data from the acquisition source indicated by the input source or output destination information included in the control data, and controls the printing unit 22 to perform printing based on the acquired input or output data. Thus, the image processing apparatus 2 acquires input or output data and executes printing in accordance with an instruction from the terminal apparatus 4 (S13).

In addition, for example, if the setting UI 400 illustrated in FIG. 9B is being displayed on the UI unit 44, the user selects a desired piece of input source or output destination information (information indicating the location where input or output data is stored) among the plural pieces of input source or output destination information using the UI unit 44, and instructs execution of the "Scanning to Folder" function. Thus, the transmitting and receiving unit 43 acquires control data including input source or output destination information indicating the output destination (storage location) of the input or output data and used to execute the "Scanning to Folder" function to the image processing apparatus 2 via the communication path 5 or another communication path (S12). The controller 25 of the image processing apparatus 2 controls the image reading unit 21 to read an image on a document, and controls the transmitting and receiving unit 26 to transmit the input or output data generated by the image reading unit 21 to the output destination (storage location) indicated by the input source or output destination information included in the control data. Thus, the image processing apparatus 2 executes scanning in accordance with an instruction from the terminal apparatus 4, and transmits the input or output data to the instructed output destination (storage location) (S13).

The operation of the image processing apparatus 2 that has received control data from the terminal apparatus 4 will be collectively described with reference to FIG. 13. For example, if the image processing apparatus 2 is to acquire input or output data and perform image processing and if the acquisition source of the input or output data is the local path in the terminal apparatus 4, the terminal apparatus 4 uploads (or transmits) the input or output data to the image processing apparatus 2, and thus the image processing apparatus 2 acquires the input or output data. Examples of the functions for which the series of operation is to be performed include "File to Printing", "File to Email", and "File to Facsimile transmission". In other words, if the "File to Printing", "File to Email", and "File to Facsimile transmission" functions are selected using the terminal apparatus 4 and if the local path in the terminal apparatus 4 is specified as the acquisition source of the input or output data, the image processing apparatus 2 acquires the input or output data from the specified local path, and executes image processing.

If the acquisition source of the input or output data is the address in an external device, the image processing apparatus 2 downloads the input or output data from the corresponding address, thereby acquiring the input or output data. Examples of the functions for which the series of operations is to be performed include "File to Printing", "File to Email", and "File to Facsimile transmission".

If the image processing apparatus 2 is to output input or output data and if the output destination (storage location) of the input or output data is the local path in the terminal apparatus 4, the image processing apparatus 2 transmits the input or output data to the terminal apparatus 4. Thus, the input or output data is stored in the terminal apparatus 4. For example, the image processing apparatus 2 transmits the input or output data to the terminal apparatus 4 as an HTTP response in response to the HTTP request. If the output destination (storage location) of the input or output data is the address in an external device, the image processing apparatus 2 uploads (or transmits) the input or output data to the corresponding address. Thus, the input or output data is stored in the external device. Examples of the functions for which the series of operation is to be performed include "Scanning to Folder" and "Scanning to DMS".

Accordingly, the image processing apparatus 2 according to this exemplary embodiment receives input source or output destination information indicating the data output destination or data acquisition source, which has been determined in accordance with the operation state of the terminal apparatus 4, from the terminal apparatus 4, and outputs input or output data to the specified location (address) based on the input source or output destination information or acquires input or output data from the specified location (address) based on the input source or output destination information. Then, the image processing apparatus 2 performs image processing.

In addition, the image processing apparatus 2 according to this exemplary embodiment detects the operation state of the terminal apparatus 4, selects plural functions (or image processing operations) that are assigned priorities in accordance with the operation state of the terminal apparatus 4, and transmits data or address data of setting UIs used to set the operation conditions of the respective functions to the terminal apparatus 4 in descending order of priority. That is, the image processing apparatus 2 selects plural functions expected to be executed in accordance with the operation state of the terminal apparatus 4, and provides the terminal apparatus 4 with data or address data of setting UIs used to set the operation conditions of the respective functions in descending order of probability of the functions being executed. Then, the image processing apparatus 2 receives input source or output destination information indicating the data output destination or data acquisition source, which has been determined in accordance with the operation state of the terminal apparatus 4, from the terminal apparatus 4, and executes image processing. In this manner, the data or address data of setting UIs for the functions to be executable after the current operation of the terminal apparatus 4 is completed is provided from the image processing apparatus 2 to the terminal apparatus 4 in descending order of probability of the functions being executed, and, in addition, input source or output destination information indicating the data output destination or data acquisition source, which has been determined in accordance with the operation state of the terminal apparatus 4, is provided from the terminal apparatus 4 to the image processing apparatus 2.

A use example of the image processing system 1 according to this exemplary embodiment will be described. For example, a contactless IC card such as a Felica (registered trademark) card is incorporated in the terminal apparatus 4, and an IC card authentication device that authenticates the contactless IC card is provided in the image processing apparatus 2. A user operates the terminal apparatus 4, thereby allowing a file, a folder, a web page, or any other suitable item to be displayed on the terminal apparatus 4. The user places the terminal apparatus 4 incorporating the contactless IC card on or near the IC card authentication device while the file or the like being displayed on the terminal apparatus 4, thereby allowing communication to be established between the contactless IC card and the IC card authentication device via radio transmission and reception. Thus, the request information and the operation state information are transmitted from the terminal apparatus 4 to the image processing apparatus 2, and the setting UI corresponding to the operation state is transmitted from the image processing apparatus 2 to the terminal apparatus 4. Then, the data output destination or data acquisition source corresponding to the operation state is set using the terminal apparatus 4, and input source or output destination information indicating the output destination or acquisition source is transmitted from the terminal apparatus 4 to the image processing apparatus 2. Thus, the specified image processing is executed by the image processing apparatus 2. In this use example, the user may only be required to place the terminal apparatus 4 on or near the IC card authentication device of the image processing apparatus 2 while a file or the like is being displayed on the terminal apparatus 4, in order to set the output destination or acquisition source corresponding to the operation state of the terminal apparatus 4 in the image processing apparatus 2 and to execute the image processing corresponding to the operation state.

Hardware Configuration

The image processing apparatus 2 described above for illustrative purposes includes a processor such as a central processing unit (CPU) (not illustrated). The processor executes a program stored in a memory (not illustrated) to implement the respective functions of the UI providing unit 24 and the controller 25. The program is stored in a storage device such as a hard disk drive (HDD) through a recording medium such as a compact disc (CD) or a digital versatile disc (DVD) or via a communication path such as a network. The program may be stored in advance in a storage device such as a hard disk drive. The program stored in a storage device such as a hard disk drive is read by a memory such as a random access memory (RAM) and is executed by the processor, such as a CPU, to implement the respective functions of the UI providing unit 24 and the controller 25 described above.

Further, the terminal apparatus 4 described above for illustrative purposes includes a processor such as a CPU (not illustrated). The processor executes a program stored in a memory (not illustrated) to implement the respective functions of the controller 41 and the operation state acquisition unit 42. The program is stored in the memory through a recording medium such as a CD or DVD or via a communication path such as a network. The program may be stored in the memory in advance. In addition, if the terminal apparatus 4 is connected to the image processing apparatus 2 via the communication path 5 or another communication path, a program for implementing the function of each of the controller 41 and the operation state acquisition unit 42 may be transmitted from the image processing apparatus 2 to the terminal apparatus 4, and may be stored in the memory of the terminal apparatus 4. The program stored in the memory is executed by the processor, such as a CPU, to implement the respective functions of the controller 41 and the operation state acquisition unit 42 described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a receiving unit configured to receive, from a terminal apparatus connected to the image processing apparatus via a communication path, a request for specific information for allowing the terminal apparatus to transmit command data relating to image processing;
   a selection unit configured to select at least one piece of specific information in accordance with the request; and
   a transmitting unit configured to transmit the at least one piece of specific information selected by the selection unit to the terminal apparatus,
   wherein the receiving unit is configured to, after the transmitting unit transmits the at least one piece of specific information to the terminal apparatus, receive from the terminal apparatus command data created by the terminal apparatus based on the specific information,
   wherein the command data comprises input source or output destination information indicating an output destination or acquisition source of data to be subjected to the image processing, the output destination or acquisition source being determined in accordance with an operation state of the terminal apparatus,
   wherein the receiving unit is configured to receive operation state information indicating the operation state of the terminal apparatus,
   wherein the selection unit is configured to, upon detecting, based on the operation state information, that he terminal apparatus is in a specific operation state relating to image processing, select the at least one piece of specific information to allow the terminal apparatus to transmit command data relating to image processing to be executable subsequent to the specific operation state, and
   wherein the at least one piece of specific information selected by the selection unit comprises a plurality of pieces of specific information.

2. The image processing apparatus according to claim 1, wherein the transmitting unit is configured to transmit address data of a user interface to the terminal apparatus as the specific information, the user interface being used to allow the terminal apparatus to transmit the command data relating to image processing.

3. The image processing apparatus according to claim 1, wherein the transmitting unit transmits data of a user interface to the terminal apparatus as the specific information, the user interface being used to allow the terminal apparatus to transmit the command data relating to image processing.

4. The image processing apparatus according to claim 1, wherein the specific information comprises information for allowing a user to set the operating conditions of the image processing apparatus.

5. The image processing apparatus according to claim 1, wherein the transmitting unit is configured to, when transmitting the plurality of pieces of specific information to the terminal apparatus, transmit the plurality of pieces of specific information to the terminal apparatus in accordance with priorities assigned to the plurality of pieces of specific information, the priorities being assigned to the plurality of pieces of specific information in accordance with the specific operation state.

6. The image processing apparatus according to claim 5, wherein the receiving unit is configured to, after the transmitting unit transmits the at least one piece of specific information to the terminal apparatus, receive from the terminal apparatus command data created by the terminal apparatus based on the specific information, and
   wherein the command data comprises input source or output destination information indicating an output destination or acquisition source of data to be subjected to image processing to be executable subsequent to the specific operation state, the output destination or acquisition source being determined in accordance with the specific operation state.

7. The image processing apparatus according to claim 6, wherein the transmitting unit is configured to transmit address data of a user interface to the terminal apparatus as the specific information, the user interface being used to allow the terminal apparatus to transmit the command data relating to image processing.

8. The image processing apparatus according to claim 6, wherein the transmitting unit is configured to transmit data of a user interface to the terminal apparatus as the specific information, the user interface being used to allow the terminal apparatus to transmit the command data relating to image processing.

9. The image processing apparatus according to claim 6, wherein:
   the priorities are levels of probability of image processing being executed in accordance with the specific operation state, and
   the transmitting unit is configured to transmit the plurality of pieces of specific information to the terminal apparatus in accordance with priorities based on levels of probability of image processing being executed.

10. An image processing apparatus comprising:
    a receiving unit configured to receive, from a terminal apparatus connected to the image processing apparatus via a communication path, a request for specific information for allowing the terminal apparatus to transmit command data relating to image processing;
    a selection unit configured to select at least one piece of specific information in accordance with the request; and
    a transmitting unit configured to transmit the at least one piece of specific information selected by the selection unit to the terminal apparatus,
    wherein the receiving unit is configured to, after the transmitting unit transmits the at least one piece of specific information to the terminal apparatus, receive from the terminal apparatus command data created by the terminal apparatus based on the specific information, wherein the command data comprises input source or output destination information indicating an output destination or acquisition source of data to be subjected to the image processing, the output destination or acquisition source being determined in accordance with an operation state of the terminal apparatus,
    wherein the selection unit is configured to, upon detecting, based on the operation state information, a state of an operation being performed using application software relating to image processing, select the at least one piece of specific information in accordance with the detected state of the operation, the receiving unit is configured to, after the transmitting unit transmits the at least one piece of specific information to the terminal apparatus, receive from the terminal apparatus command data created by the terminal apparatus based on the specific information, and
    wherein the command data comprises input source or output destination information indicating an output destination or acquisition source determined in accordance with the detected state of the operation.

11. The image processing apparatus according to claim 10, wherein:
the image processing comprises a printing operation,
the selection unit is configured to, upon detecting, based on the operation state information, that a file is being displayed on the terminal apparatus using the application software, select specific information concerning the printing operation,
the transmitting unit is configured to transmit the specific information concerning the printing operation selected by the selection unit to the terminal apparatus,
the receiving unit is configured to, after the transmitting unit transmits the specific information concerning the printing operation to the terminal apparatus, receive from the terminal apparatus command data created by the terminal apparatus based on the specific information, and
the command data comprises input source or output destination information indicating as the acquisition source an address of the file being displayed on the terminal apparatus.

12. The image processing apparatus according to claim 10, wherein:
the image processing comprises an image reading operation,
the selection unit is configured to, upon detecting, based on the operation state information, that a folder is being displayed on the terminal apparatus using the application software, select specific information concerning the image reading operation,
the transmitting unit is configured to transmit the specific information concerning the image reading operation selected by the selection unit to the terminal apparatus,
the receiving unit is configured to, after the transmitting unit transmits the specific information concerning the image reading operation to the terminal apparatus, receive from the terminal apparatus command data created by the terminal apparatus based on the specific information, and
the command data comprises input source or output destination information indicating as the output destination an address of the file being displayed on the terminal apparatus.

13. An image processing system comprising:
a terminal apparatus; and
an image processing apparatus connected to the terminal apparatus via a communication path,
wherein the image processing apparatus comprises:
a receiving unit configured to receive, from the terminal apparatus via the communication path, a request for specific information for allowing the terminal apparatus to transmit command data relating to image processing;
a selection unit configured to select at least one piece of specific information in accordance with the request; and
a first transmitting unit configured to transmit the at least one piece of specific information selected by the selection unit to the terminal apparatus;
wherein the terminal apparatus comprises:
an operation state acquisition unit configured to detect an operation state of the terminal apparatus;
a controller configured to, upon receiving the at least one piece of specific information from the image processing apparatus, acquire input source or output destination information indicating an output destination or acquisition source of data to be subjected to the image processing, the output destination or acquisition source being determined in accordance with the operation state,
wherein the controller is configured to create the command data based on the specific information, the command data comprising the input source or output destination information; and
a second transmitting unit configured to transmit the command data to the image processing apparatus,
wherein:
the receiving unit is configured to receive operation state information indicating the operation state of the terminal apparatus from the terminal apparatus via the communication path,
the selection unit is configured to, upon detecting, based on the operation state information, that the terminal apparatus is in a specific operation state relating to image processing, select the at least e piece of specific information to allow the terminal apparatus to transmit command data concerning image processing to be executable subsequent to the specific operation state, and
the first transmitting unit is configured to transmit the at least one piece of specific information selected by the selection unit to the terminal apparatus.

14. The image processing system according to claim 13, wherein:
the first transmitting unit is configured to, when transmitting a plurality of pieces of specific information to the terminal apparatus, transmit the plurality of pieces of specific information to the terminal apparatus in accordance with priorities assigned to the plurality of pieces of specific information, the priorities being assigned to the plurality of pieces of specific information in accordance with the specific operation state, and
the controller is configured to, upon receiving the at least one piece of specific information from the image processing apparatus, create command data comprising input source or output destination information comprising an output destination or acquisition source of data to be subjected to image processing to be executable subsequent to the specific operation state, the output destination or acquisition source being determined in accordance with the specific operation state.

15. The image processing system according to claim 14, wherein:
the terminal apparatus further comprises a display,
the controller is configured to, in response to the operation state acquisition unit detecting that a file is being displayed on the display, acquire an address of the file being displayed on the display as the input source or output destination information indicating the acquisition source of the data, and
the controller is configured to, in response to a plurality of files being displayed on the display, acquire an address of a file being operated among the plurality of files as input source or output destination information indicating an acquisition source having highest priority.

16. The image processing system according to claim 14, wherein:
the terminal apparatus further comprises a display,
the controller is configured to, in response to the operation state acquisition unit detecting that a folder is being displayed on the display, acquire an address of the folder being displayed on the display as the input source or output destination information indicating the output destination of the data, and the controller is configured to, in response to a plurality of folders being displayed on the display, acquire an address of a folder being operated among the plurality of folders as input source or output destination information indicating an output destination having highest priority.

17. The image processing system according to claim 14, wherein the terminal apparatus further comprises a display, the controller is configured to, in response to the operation state acquisition unit detecting that a web page is being displayed on the display, acquire an address of the web page being displayed on the display as the input source or output destination information indicating the acquisition source of the data, and the controller is configured to, in response to a plurality of web pages being displayed on the display, acquire an address of a web page being operated among the plurality of web pages as input source or output destination information indicating an acquisition source having highest priority.

18. The image processing system according to claim 13, wherein the specific information comprises information for allowing a user to set the operating conditions of the image processing apparatus.

19. An image processing system comprising:

a terminal apparatus; and an image processing apparatus connected to the terminal apparatus via a communication path, wherein the image processing apparatus comprises:

a receiving unit configured to receive, from the terminal apparatus via the communication path, a request for specific information for allowing the terminal apparatus to transmit command data relating to image processing;

a selection unit configured to select at least one piece of specific information in accordance with the request; and a first transmitting unit configured to transmit the at least one piece of specific information selected by the selection unit to the terminal apparatus;

wherein the terminal apparatus comprises:

an operation state acquisition unit configured to detect an operation state of the terminal apparatus:

a controller configured to, upon receiving the at least one piece of specific information from the image processing apparatus acquire input source or output destination information indicating an output destination or acquisition source of data to be subjected to the image processing, the output destination or acquisition source being determined in accordance with the operation state, wherein the controller is configured to create the command data based on the specific information, the command data comprising the input source or output destination information; and a second transmitting unit configured to transmit the command data to the image processing apparatus, wherein:

the terminal apparatus further comprises a display, the controller is configured to, in response to the operation state acquisition unit detecting that a file is being displayed on the display, acquire an address of the file being displayed on the display as the input source or output destination information indicating the acquisition source of the data, and the controller is configured to, in response to a plurality of files being displayed on the display, acquire an address of a file being operated among the plurality of files as input source or output destination information indicating an acquisition source having highest priority.

20. An image processing system comprising:

a terminal apparatus; and an image processing apparatus connected to the terminal apparatus via a communication path, wherein the image processing apparatus comprises:

a receiving unit configured to receive, from the terminal apparatus via the communication path, a request for specific information for allowing the terminal apparatus to transmit command data relating to image processing;

a selection unit configured to select at least one piece of specific information in accordance with the request; and a first transmitting unit configured to transmit the at least one piece of specific information selected by the selection unit o the terminal apparatus:

wherein the terminal apparatus comprises:

an operation state acquisition unit configured to detect an operation state of the terminal apparatus;

a controller configured to, upon receiving the at least one piece of specific information from the image processing apparatus, acquire input source or output destination information indicating an output destination or acquisition source of data to be subjected to the image processing, the output destination or acquisition source being determined in accordance with the operation state, wherein the controller is configured to create the command data based on the specific information, the command data comprising the input source or output destination information; and a second transmitting, unit configured to transmit the command data to the image processing apparatus, wherein:

the terminal apparatus further comprises a display, the controller is configured to, in response to the operation state acquisition unit detecting that a folder is being displayed on the display, acquire an address of the folder being displayed on the display as the input source or output destination information indicating the output destination of the data, and the controller is configured to, in response to a plurality of folders being displayed on the display, acquire an address of a folder being operated among the plurality of folders as input source or output destination information indicating an output destination having highest priority.

21. An image processing system comprising:

a terminal apparatus; and an image processing apparatus connected to the terminal apparatus via a communication path, wherein the image processing apparatus comprises:

a receiving unit configured to receive, from the terminal apparatus via the communication path, a request for specific information for allowing the terminal apparatus to transmit command data relating to image processing;

a selection unit configured to select at least one piece of specific information in accordance with the request; and a first transmitting unit configured to transmit the at least one piece of specific information selected by the selection unit to the terminal apparatus;

wherein the terminal apparatus comprises:

an operation state acquisition unit configured to detect an operation state of the terminal apparatus;

a controller configured to, upon receiving the at least one piece of specific information from the image processing apparatus, acquire input source or output destination information indicating an output destination or acquisition source of data to be subjected to the image processing, the output destination or acquisition source being determined in accordance with the operation state, wherein the controller is configured to create the command data based on the specific information, the command data comprising the input source or output destination information; and a second transmitting unit configured to transmit the command data to the image processing apparatus, wherein:

the terminal apparatus further comprises a display, the controller is configured to, in response to the operation state acquisition unit detecting that a web page is being displayed on the display, acquire an address of the web page being displayed on the display as the input source or output destination information indicating the acquisition source of the data, and the controller is configured to, in response to a plurality of web pages being displayed on the display, acquire an address of a web page being operated among the plurality of web pages as input source or output destination information indicating an acquisition source having highest priority.

22. A non-transitory computer readable medium storing a program causing a computer to execute a process, the process comprising:

receiving, from a terminal apparatus connected to an image processing apparatus via a communication path, a request for specific information for allowing the terminal apparatus to transmit command data relating to image processing;

selecting at least one piece of specific information in accordance with the request;

transmitting the selected at least one piece of specific information to the terminal apparatus; and after transmitting the at least one piece of specific information to the terminal apparatus, receiving from the terminal apparatus command data created by the terminal apparatus based on the specific information, wherein the command data comprises input source or output destination information indicating an output destination or acquisition source of data to be subjected to the image processing, the output destination or acquisition source being determined in accordance with an operation state of the terminal apparatus, wherein the process further comprises receiving operations state information indicating the operation state of the terminal apparatus, wherein the selecting comprises, upon detecting, based on the operation state information, that the terminal apparatus is in a specific operation state relating to image processing, selecting the at least e piece of specific information to allow the terminal apparatus to transmit command data relating to image processing to be executable subsequent to the specific operation state, and wherein the at least one piece of specific information selected comprises a plurality of pieces of specific information.

23. The non-transitory computer readable medium according to claim 22, wherein the specific information comprises information for allowing a user to set the operating conditions of the image processing apparatus.

* * * * *